US011311840B2

(12) United States Patent
Hatton et al.

(10) Patent No.: US 11,311,840 B2
(45) Date of Patent: Apr. 26, 2022

(54) CARBON DIOXIDE REMOVAL USING SEQUESTRATION MATERIALS THAT INCLUDE SALTS IN MOLTEN FORM, AND RELATED SYSTEMS AND METHODS

(71) Applicants: Massachusetts Institute of Technology, Cambridge, MA (US); Saudi Arabian Oil Company, Dhahran (SA)

(72) Inventors: Trevor Alan Hatton, Sudbury, MA (US); Takuya Harada, Nagoya (JP); Aqil Jamal, Dhahran (SA); Cameron G. Halliday, Wokingham (GB)

(73) Assignees: Massachusetts Institute of Technology, Cambridge, MA (US); Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/282,522

(22) PCT Filed: Jul. 9, 2019

(86) PCT No.: PCT/US2019/040961
§ 371 (c)(1),
(2) Date: Apr. 2, 2021

(87) PCT Pub. No.: WO2020/072115
PCT Pub. Date: Apr. 9, 2020

(65) Prior Publication Data
US 2021/0387141 A1 Dec. 16, 2021

Related U.S. Application Data

(60) Provisional application No. 62/815,656, filed on Mar. 8, 2019, provisional application No. 62/742,078, filed on Oct. 5, 2018.

(51) Int. Cl.
*B01D 53/62* (2006.01)
*B01D 53/14* (2006.01)
(Continued)

(52) U.S. Cl.
CPC ......... *B01D 53/62* (2013.01); *B01D 53/1425* (2013.01); *B01D 53/1475* (2013.01);
(Continued)

(58) Field of Classification Search
CPC ............... B01D 53/62; B01D 53/1425; B01D 53/1475; B01D 53/1493; B01D 53/78;
(Continued)

(56) References Cited

U.S. PATENT DOCUMENTS 1,783,901 A 12/1930 Bottoms
4,086,323 A 4/1978 Moore et al.
(Continued)

FOREIGN PATENT DOCUMENTS

CN 102895847 A 1/2013
CN 107029538 A 8/2017
(Continued)

OTHER PUBLICATIONS

International Search Report for International Patent Application No. PCT/US2019/040961, dated Sep. 30, 2019.
(Continued)

*Primary Examiner* — Anita Nassiri-Motlagh
(74) *Attorney, Agent, or Firm* — Wolf, Greenfield & Sacks, P.C.

(57) ABSTRACT

The removal of carbon dioxide using sequestration materials that include salts in molten form, and related systems and methods, are generally described.

21 Claims, 29 Drawing Sheets

(51) Int. Cl.
  *B01D 53/78* (2006.01)
  *B01D 53/96* (2006.01)
(52) U.S. Cl.
  CPC ......... *B01D 53/1493* (2013.01); *B01D 53/78* (2013.01); *B01D 53/96* (2013.01); *B01D 2251/302* (2013.01); *B01D 2251/304* (2013.01); *B01D 2251/306* (2013.01); *B01D 2251/60* (2013.01); *B01D 2252/10* (2013.01); *B01D 2257/504* (2013.01); *B01D 2258/0283* (2013.01)
(58) Field of Classification Search
  CPC .............. B01D 53/96; B01D 2251/304; B01D 2251/306; B01D 2251/60; B01D 2252/10; B01D 2257/504; B01D 2258/0283
  USPC ...................................................... 423/210.5
  See application file for complete search history.

(56) References Cited

U.S. PATENT DOCUMENTS

| | | | |
|---|---|---|---|
| 4,208,387 | A | 6/1980 | Klass et al. |
| 4,448,899 | A | 5/1984 | Hass |
| 4,470,958 | A | 9/1984 | van Gelder et al. |
| 4,973,456 | A | 11/1990 | Quinn et al. |
| 5,338,521 | A | 8/1994 | Quinn et al. |
| 5,455,015 | A | 10/1995 | Zhadanovsky |
| 7,674,947 | B2 | 3/2010 | Barends |
| 10,322,399 | B2 | 6/2019 | Harada et al. |
| 10,464,015 | B2 | 11/2019 | Worsley et al. |
| 10,625,204 | B2 | 4/2020 | Lubomirksy et al. |
| 10,913,658 | B2 | 2/2021 | Harada et al. |
| 2011/0035154 | A1 | 2/2011 | Kendall et al. |
| 2012/0128559 | A1 | 5/2012 | Olsen |
| 2017/0165633 | A1 | 6/2017 | Harada et al. |
| 2017/0361266 | A1 | 12/2017 | Find et al. |
| 2018/0354807 | A1 | 12/2018 | Harada et al. |
| 2021/0138401 | A1 | 5/2021 | Hatton et al. |
| 2021/0138438 | A1 | 5/2021 | Hatton et al. |

FOREIGN PATENT DOCUMENTS

| | | |
|---|---|---|
| DE | 100 35 188 A1 | 2/2002 |
| EP | 0 414 292 A1 | 2/1991 |
| JP | H04-367723 A | 12/1992 |
| JP | H11-183050 A | 7/1999 |
| WO | WO 2012/176208 A1 | 12/2012 |
| WO | WO 2018/227081 A1 | 12/2018 |
| WO | WO 2020/072115 A1 | 4/2020 |

OTHER PUBLICATIONS

Written Opinion of the International Searching Authority for International Patent Application No. PCT/US2019/040961, dated Sep. 30, 2019.
Harada et al., "Colloidal Nanoclusters of MgO Coated with Alkali Metal Nitrates/Nitrites for Rapid, High Capacity $CO_2$ Capture at Moderate Temperature," Chem Mater. vol. 27, pp. 8153-8161. 2015.
Harada et al., "Alkali Metal Nitrate-Promoted High-Capacity MgO Adsorbents for Regenerable $CO_2$ Capture at Moderate Temperatures," Chem Mater. vol. 27, pp. 1943-1949. 2015.
Harada et al., "Tri-lithium borate ($Li_3BO_3$); a new highly regenerable high capacity $CO_2$ adsorbent at intermediate temperature," *J. Mater. Chem A*, vol. 5, pp. 22224-22233. Oct. 7, 2017.
Rees et al., "Electrochemical $CO_2$ sequestration in ionic liquids: a perspective," Energy & Environmental Science, vol. 4, pp. 403-408. Dec. 20, 2010.
International Preliminary Report on Patentability for International Patent Application No. PCT/US2019/040961, dated Apr. 15, 2021.
[No Author Listed], Alternative Control Techniques Document—NOx Emissions from Iron and Steel Mills. United States Environmental Protection Agency. Sep. 1994:170 pages.
[No Author Listed], Effective date of implementation of the fuel oil standard in regulation 14.1.3 of MARPOL Annex VI, Resolution MEPC.280(70). International Maritime Organization. London, United Kingdom. Adopted Oct. 28, 2016. 1 page.
[No Author Listed], Initial IMO Strategy on Reduction of GHG Emissions from Ships, Resolution MEPC.304(72). International Maritime Organization. London, United Kingdom. Adopted Apr. 13, 2018. 11 pages.
[No Author Listed], Sulphur 2020 implementation—IMO issues additional guidance. International Maritime Organization. London, United Kingdom. May 20, 2019:5 pages. Accessed from <http://www.imo.org/en/MediaCentre/PressBriefings/Pages/10-MEPC-74-sulphur-2020.aspx>.
[No Author Listed], Title IV—Acid Deposition Control. United States Environmental Protection Agency. 2002:68 pages.
Abanades et al., Conversion Limits in the Reaction of CO2 with Lime. Energy and Fuels. 2003;17:308-15. Epub Jan. 28, 2003.
Alcalde et al., Estimating geological CO2 storage security to deliver on climate mitigation. Nature Communications. 2018;9:2201. 13 pages.
Alderman et al., Borate Melt Structure: Temperature-Dependent B—O Bond Lengths and Coordination Numbers from High-Energy X-Ray Diffraction. J. Am. Ceram. Soc. 2018;101:3357-71.
Alderman et al., Temperature-Driven Structural Transitions in Molten Sodium Borates Na2O—B2O3: X-Ray Diffraction, Thermodynamic Modeling, and Implications for Topological Constraint Theory. J. Phys. Chem. C. 2016;120:553-60. Epub Dec. 16, 2015.
Allanore et al., A New Anode Material for Oxygen Evolution in Molten Oxide Electrolysis. Nature. May 16, 2013;497:353-6.
Araten, Some Molten Ionic Oxides as Chemical Reagents. J. Appl. Chem. Apr. 1968;18:118-21.
Argyle et al., Heterogeneous Catalyst Deactivation and Regeneration: A Review. Catalysts. 2015;5:145-269. Epub Feb. 26, 2015.
Avrami, Kinetics of Phase Change. I General Theory. J. Chem. Phys. Journal of Chemical Physics. Dec. 1939;7:1103-12.
Backensto et al., High Temperature Hydrogen Sulfide Corrosion. Corrosion. Jan. 1956;12:22-32.
Barker et al., The Reversibility of the Reaction $CaCO3 \leftrightarrows CaO+ CO2$. J. Appl. Chem. Biotechnol. 1973;23:733-42.
Basu, Combustion of coal in circulating fluidized-bed boilers: a review. Chemical Engineering Science. 1999;54:5547-57.
Bell et al., An overview of technologies for reduction of oxides of nitrogen from combustion furnaces. MPR Associates. Washington, DC. Accessed Nov. 9, 2021 as available Mar. 22, 2015 from <https://web.archive.org/web/20150322202854/https://www.mpr.com/uploads/news/nox-reduction-coal-fired.pdf>. 23 pages.
Belo et al., High-Temperature Conversion of SO2 to SO3: Homogeneous Experiments and Catalytic Effect of Fly Ash from Air and Oxy-fuel Firing. Energy & Fuels. 2014;28:7243-51. Epub Oct. 23, 2014.
Berstad et al., Post-Combustion CO2 Capture from a Natural Gas Combined Cycle by CaO/CaCO3 Looping. Int. J. Greenh. Gas Control. 2012;11:25-33. Epub Aug. 24, 2012.
Bhatia et al., Effect of the Product Layer on the Kinetics of the CO2-Lime Reaction. AIChE J. Jan. 1983;29(1):79-86.
Blamey et al., The calcium looping cycle for large-scale CO2 capture. Progress in Energy and Combustion Science. 2010;36:260-79. Epub Dec. 29, 2009.
Blomen et al., Capture Technologies: Improvements and Promising Developments. Energy Procedia. 2009;1:1505-12.
Bobkova et al., Low-Melting Glasses Based on Borate Systems. Glas. Ceram. (English Transl. Steklo i Keramika.) 2004;61(5-6):175-7.
Bosoaga et al., CO2 capture technologies for cement industry. Energy Procedia. 2009;1:133-40.
Bui et al., Carbon capture and storage (CCS): the way forward. Energy & Environmental Science. 2018;11:1062-176. Epub Mar. 12, 2018.
Chakravarty et al., Reaction of acid gases with mixtures of amines. Chem. Eng. Prog. Apr. 1985;81(4):32-6.
Chen et al., High-temperature sulfidation behavior of Ni—Nb alloys. Oxidation of Metals. 1989;31(3/4):237-63.

(56) References Cited

OTHER PUBLICATIONS

Chen et al., Outdoor air pollution: nitrogen dioxide, sulfur dioxide, and carbon monoxide health effects. The American Journal of the Medical Sciences. Apr. 2007;333(4):249-56.
Choi et al., Adsorbent materials for carbon dioxide capture from large anthropogenic point sources. ChemSusChem. 2009;2(9):796-854. doi: 10.1002/cssc.200900036.
Courson et al., CaO-Based High-Temperature CO2 Sorbents. In Pre-combustion Carbon Dioxide Capture Materials; Wang, Q., Ed.; The Royal Society of Chemistry. London, United Kingdom. 2018:144-237.
Cousin-Saint-Remi et al., Applying the wave theory to fixed-bed dynamics of Metal-Organic Frameworks exhibiting stepped adsorption isotherms: Water/ethanol separation on ZIF-8. Chemical Engineering Journal. 2017;324:313-23. Epub Apr. 28, 2017.
Cuffe et al., Air Pollutant Emissions from Coal-Fired Power. Journal of the Air Pollution Control Association. 1964;14(9):353-62.
Da Silva et al., Emissions from Postcombustion CO2 Capture Plants. Environmental Science & Technology. 2013;47:659-60. Epub Jan. 3, 2013.
D'Alessandro et al., Carbon Dioxide Capture: Prospects for New Materials. Angewandte Chemie International Edition. Aug. 2010;49:6058-82.
Darunte et al., Moving Beyond Adsorption Capacity in Design of Adsorbents for CO2 Capture from Ultradilute Feeds: Kinetics of CO2 Adsorption in Materials with Stepped Isotherms. Industrial & Engineering Chemistry Research. 2019;58:366-77. Epub Dec. 6, 2018.
Das et al., An Overview of Utilization of Slag and Sludge from Steel Industries. Resour. Conserv. Recycl. 2007;50:40-57. Epub Jul. 7, 2006.
Davidson et al., IPCC Special Report on Carbon Dioxide Capture and Storage. Prepared by Working Group III of the International Panel on Climate Change. [Metz, B., O. Davidson, H. C. de Coninck, M. Loos, and L. A. Meyer (eds.)]. Cambridge University Press, Cambridge, United Kingdom and New York, NY, USA. 2005:443 pages.
De Bruijn et al., Kinetic Parameters in Avrami-Erofeev Type Reactions from Isothermal and Non-Isothermal Experiments. Thermochimica Acta. 1981;45:315-25.
Dessureault et al., Coupled Phase Diagram/Thermodynamic Analysis of the Nine Common-Ion Binary Systems Involving the Carbonates and Sulfates of Lithium, Sodium, and Potassium. Journal of the Electrochemical Society. Sep. 1990;137:2941-50.
Dolan et al., Multicomponent Diffusion in Molten Slags. Metall. Mater. Trans. B. Aug. 2004;35B:675-84.
Dutcher et al., Amine-Based CO2 Capture Technology Development from the Beginning of 2013—A Review. ACS Appl. Mater. Interfaces. 2015;7:2137-48. Epub Jan. 21, 2015.
Edenhofer et al., Climate Change 2014: Mitigation of Climate Change. Contribution of Working Group III to the Fifth Assessment Report of the Intergovernmental Panel on Climate Change. Cambridge University Press, Cambridge, United Kingdom and New York, NY, USA. 2014:1454 pages.
Elkin et al., Molten Oxide Glass Materials for Thermal Energy Storage. Energy Procedia. 2014;49:772-9.
Eow, Recovery of Sulfur from Sour Acid Gas: A Review of the Technology. Environmental Progress. Oct. 2002;21(3):143-62.
Fang et al., Continuous CO2 Capture from Flue Gases Using a Dual Fluidized Bed Reactor with Calcium-Based Sorbent. Ind. Eng. Chem. Res. 2009;48:11140-7. Epub Nov. 18, 2009.
Feng et al., Overcoming the Problem of Loss-in-Capacity of Calcium Oxide in CO2 Capture. Energy and Fuels. 2006;20:2417-20. Epub Oct. 5, 2006.
Fine et al., Absorption of nitrogen oxides in aqueous amines. Energy Procedia. 2014;63:830-47.
Gao et al., MgO-Based Intermediate-Temperature CO2 Adsorbents. In Pre-combustion Carbon Dioxide Capture Materials; Wang, Q., Ed.; The Royal Society of Chemistry. London, United Kingdom. 2018:61-143.
Garg et al., A technology review for regeneration of sulfur rich amine systems. International Journal of Greenhouse Gas Control. 2018;75:243-53.
Gehring et al., Emissions Trading Lessons From SOx and NOx Emissions Allowance and Credit Systems Legal Nature, Title, Transfer, and Taxation of Emission Allowances and Credits. Environmental Law Reporter. 2005:17 pages.
Grasa et al., CO2 Capture Capacity of CaO in Long Series of Carbonation/Calcination Cycles. Ind. Eng. Chem. Res. 2006;45:8846-51. Epub Nov. 9, 2006.
Guidotti, Hydrogen Sulfide: Advances in Understanding Human Toxicity. International Journal of Toxicology. 2010;29(6):569-81. Epub Nov. 12, 2010.
Gupta et al., Carbonation-Calcination Cycle Using High Reactivity Calcium Oxide for Carbon Dioxide Separation from Flue Gas. Industrial & Engineering Chemistry Research. 2002;41:4035-42. Epub Jul. 11, 2002.
Halliday et al., Acid Gas Capture at High Temperatures Using Molten Alkali Metal Borates. Environ Sci Technol. May 19, 2020;54(10):6319-6328. doi: 10.1021/acs.est.0c01671. Epub Apr. 29, 2020.
Halliday et al., Bench-Scale Demonstration of Molten Alkali Metal Borates for High-Temperature CO2 Capture. Ind. Eng. Chem. Res. 2020;59(19):8937-45. Epub Apr. 19, 2020.
Halliday et al., Sorbents for the Capture of CO2 and Other Acid Gases: A Review. Ind. Eng. Chem. Res. 2021;60(26):9313-46. Epub Jun. 28, 2021.
Hanak et al., A review of developments in pilot-plant testing and modelling of calcium looping process for CO2 capture from power generation systems. Energy & Environmental Science. 2015;8:2199-249. Epub Jun. 8, 2015.
Hanak et al., Calcium looping combustion for high-efficiency low-emission power generation. Journal of Cleaner Production. 2017;161:245-55. Epub May 19, 2017.
Harada et al., Molten ionic oxides for CO2 capture at medium to high temperatures. J. Mater. Chem. A. 2019;7:21827-34. Epub Sep. 5, 2019.
Harrison, Sorption-Enhanced Hydrogen Production: A Review. Ind. Eng. Chem. Res. 2008;47:6486-501. Epub Jul. 31, 2008.
Jansen et al., Pre-Combustion CO2 Capture. Int. J. Greenh. Gas Control. 2015;40:167-87. Epub Jul. 27, 2015.
Janz et al., Molten Salts Data: Diffusion Coefficients in Single and Multi Component Salt Systems. J. Phys. Chem. Ref. Data. 1982;11(3):505-693.
Kato et al., Carbon Dioxide Absorption by Lithium Orthosilicate in a Wide Range of Temperature and Carbon Dioxide Concentrations. J. Mater. Sci. Lett. 2002;21:485-7.
Khawam et al., Solid-State Kinetic Models: Basics and Mathematical Fundamentals. J. Phys. Chem. B. 2006;110:17315-28. Epub Aug. 15, 2006.
Kierzkowska et al., CaO-Based CO2 Sorbents: From Fundamentals to the Development of New, Highly Effective Materials. ChemSusChem. 2013;6:1130-48.
Kim et al., A Solid Sorbent-Based Multi-Stage Fluidized Bed Process with Inter-Stage Heat Integration as an Energy Efficient Carbon Capture Process. Int. J. Greenh. Gas Control. 2014;26:135-46. Epub May 21, 2014.
Ko et al., The sorption of hydrogen sulfide from hot syngas by metal oxides over supports. Chemosphere. 2005;58:467-74. Epub Nov. 10, 2004.
Koningen et al., Sulfur-Deactivated Steam Reforming of Gasified Biomass. Ind. Eng. Chem. Res. 1998;37:341-6. Epub Jan. 16, 1998.
Koytsoumpa et al., The CO2 economy: Review of CO2 capture and reuse technologies. The Journal of Supercritical Fluids. 2018;132:3-16. Epub Jul. 25, 2017.
Kramer et al., Thermal Decomposition of NaNO3 and KNO3. Proceedings of the Electrochemical Society. 1981:494-505.
Lara et al., Energy integration of high and low temperature solid sorbents for CO2 capture. Energy Procedia. 2017;114:2380-9.
Lashof et al., Relative contributions of greenhouse gas emissions to global warming. Nature. Apr. 5, 1990;344:529-31.

(56) References Cited

OTHER PUBLICATIONS

Lee et al., Potential flue gas impurities in carbon dioxide streams separated from coal-fired power plants. J. Air & Waste Mange. Assoc. Jun. 2009;59:725-32.

Leung et al., An overview of current status of carbon dioxide capture and storage technologies. Renewable and Sustainable Energy Reviews. 2014;39:426-43. Epub Aug. 2, 2014.

Likens et al., Acid Rain: A Serious Regional Environmental Problem. Science. Jun. 14, 1974;184(4142):1176-9.

Lin et al., The mechanism of coal gas desulfurization by iron oxide sorbents. Chemosphere. 2015;121:62-7. Epub Nov. 27, 2014.

Lu et al., Calcium Oxide Based Sorbents for Capture of Carbon Dioxide at High Temperatures. Ind. Eng. Chem. Res. 2006;45:3944-9. Epub May 3, 2006.

Mazzotti et al., Equilibrium theory-based analysis of nonlinear waves in separation processes. Annual Review of Chemical and Biomolecular Engineering. 2013;4:119-41. Epub Feb. 28, 2013.

Memon et al., Alkali Metal CO2 Sorbents and the Resulting Metal Carbonates: Potential for Process Intensification of Sorption-Enhanced Steam Reforming. Environ. Sci. Technol. 2017;51;12-27. Epub Dec. 7, 2016.

Mess et al., Product Layer Diffusion during the Reaction of Calcium Oxide with Carbon Dioxide. Energy and Fuels. 1999;13:999-1005. Epub Jul. 22, 1999.

Misiak et al., Next Generation Post-combustion Capture: Combined CO2 and SO2 Removal. Energy Procedia. Dec. 2013;37:1150-9.

Mitsui et al., High Temperature Sulfidation and Oxidation Behavior of Sputter-Deposited Al-refractory Metal Alloys. Materials Transactions, JIM. 1996;37(3):379-82.

Miyamoto et al., KM CDR ProcessTM Project Update and the New Novel Solvent Development. Energy Procedia. 2017;114:5616-23.

Mrowec, The Problem of Sulfur in High-Temperature Corrosion. Oxidation of Metals. 1995;44(1/2):177-209.

Nakagawa et al., A Novel Method of CO2 Capture from High Temperature Gases. J. Electrochem. Soc. Apr. 1998;145(4):1344-6.

Nielsen et al., Atmospheric chemistry and environmental impact of the use of amines in carbon capture and storage (CCS). Chemical Society Reviews. 2012;41:6684-704.

Oko et al., Current Status and Future Development of Solvent-Based Carbon Capture. Int. J. Coal Sci. Technol. 2017;4(1):5-14. Epub Feb. 27, 2017.

Pachauri et al., Climate Change 2014: Synthesis Report. Contribution of Working Groups I, II and III to the Fifth Assessment Report of the Intergovernmental Panel on Climate Change [Core Writing Team, R.K. Pachauri and L.A. Meyer (eds.)]. IPCC, Geneva, Switzerland. 2015:169 pages.

Pearson et al., An Update on the Development of the CSIRO's CS-Cap Combined CO2 and SO2 Capture Process. Energy Procedia. 2017;114:1721-8.

Perejon et al., The Calcium-Looping technology for CO2 capture: On the important roles of energy integration and sorbent behavior. Applied Energy. 2016;162:787-807. Epub Nov. 11, 2015.

Plessen et al., Verwertung von Natriumsulfat. Chem. Ing. Tech. 1989;61:933-40.

Qiao et al., Alkali Nitrates Molten Salt Modified Commercial MgO for Intermediate-Temperature CO2 Capture: Optimization of the Li/Na/K Ratio. Ind. Eng. Chem. Res. 2017;56:1509-17. Epub Jan. 23, 2017.

Ramkumar et al., Calcium Looping Process for Enhanced Catalytic Hydrogen Production with Integrated Carbon Dioxide and Sulfur Capture. Industrial & Engineering Chemistry Research. Ind. Eng. Chem. Res. 2011;50:1716-29. Epub Dec. 27, 2010.

Rao et al., A Technical, Economic, and Environmental Assessment of Amine-Based CO2 Capture Technology for Power Plant Greenhouse Gas Control. Environmental Science & Technology. 2002;36:4467-75. Epub Sep. 6, 2002.

Reddy et al., Layered Double Hydroxides for CO2 Capture: Structure Evolution and Regeneration. Ind. Eng. Chem. Res. 2006;45:7504-9. Epub Oct. 4, 2006.

Rezaei et al., SOx/NOx Removal from Flue Gas Streams by Solid Adsorbents: A Review of Current Challenges and Future Directions. Energy Fuels. 2015;29(9):5467-86. Epub Aug. 4, 2015.

Robinson, Sulfur Removal and Recovery. Springer Handbook of Petroleum Technology. Springer International Publishing. 2017:649-73.

Rochelle et al., Aqueous piperazine as the new standard for CO2 capture technology. Chemical Engineering Journal. 2011;171:725-33. Epub Feb. 24, 2011.

Rochelle, Amine Scrubbing for CO2 Capture. Science. Sep. 25, 2009;325:1652-4.

Rochelle, Thermal degradation of amines for CO2 capture. Current Opinion in Chemical Engineering. 2012;1:183-90.

Rockstrom et al., A roadmap for rapid decarbonization. Science. Mar. 24, 2017;355(6331):1269-71.

Rodriguez et al., Interaction of Sulfur with Well-Defined Metal and Oxide Surfaces: Unraveling the Mysteries behind Catalyst Poisoning and Desulfurization. Accounts of Chemical Research. 1999;32(9):719-28. Epub Jun. 16, 1999.

Rogelj et al., Energy system transformations for limiting end-of-century warming to below 1.5° C. Nature Climate Change. Jun. 2015;5:519-27.

Rubin et al., The outlook for improved carbon capture technology. Progress in Energy and Combustion Science. 2012;38:630-71. Epub May 12, 2012.

Schmalensee et al., Lessons Learned from Three Decades of Experience with Cap and Trade. Review of Environmental Economics and Policy. 2017;11(1):59-79.

Schorr et al., Gas Turbine NOx Emissions Approaching Zero—Is it Worth the Price? GE Power Generation. General Electric Company. Schenectady, NY. 1999:11 pages.

Sexton et al., Evaluation of Reclaimer Sludge Disposal from Post-combustion CO2 Capture. Energy Procedia. 2014;63:926-39.

Shartsis et al., Viscosity and Electrical Resistivity of Molten Alkali Borates. J. Am. Ceram. Soc. Oct. 1, 1953;36(10):319-26.

Shimizu et al., A Twin Fluid-Bed Reactor for Removal of CO2 from Combustion Processes. Trans IChemE. Jan. 1999;77(A):62-8.

Singh et al., A review on methods of flue gas cleaning from combustion of biomass. Renewable and Sustainable Energy Reviews. 2014;29:854-64. Epub Oct. 2, 2013.

Singh et al., Shell Cansolv CO2 capture technology: Achievement from First Commercial Plant. Energy Procedia. 2014;63:1678-85. Epub Dec. 31, 2014.

Song, CO2 conversion and utilization: an overview. ACS Symposium Series, American Chemical Society. Washington, DC. 2002:29 pages.

Sötz et al., Molten salt chemistry in nitrate salt storage systems: Linking experiments and modeling. Energy Procedia. 2018;155:503-13.

Spengler et al., Acid air and health. Environmental Science & Technology. 1990;24(7):946-56.

Srivastava et al., Flue Gas Desulfurization: The State of the Art. Journal of the Air & Waste Management Association. Dec. 2001;51:1676-88.

Stanger et al., Oxyfuel Combustion for CO2 Capture in Power Plants. Int. J. Greenh. Gas Control. 2015;40:55-125. Epub Aug. 4, 2015.

Strohle et al., Simulation of the Carbonate Looping Process for Post-Combustion CO2 Capture from a Coal-Fired Power Plant. Chem. Eng. Technol. 2009;32(3):435-42.

Subha et al., Enhanced CO2 Absorption Kinetics in Lithium Silicate Platelets Synthesized by a Sol-gel Approach. J. Mater. Chem. A. 2014;2:12792. Author manuscript provided. 9 pages.

Sun et al., Abatement technologies for high concentrations of NOx and SO2 removal from exhaust gases: A review. Critical Reviews in Environmental Science and Technology. 2016;46(2):119-42. Epub Sep. 23, 2015.

Sun et al., Ceramics Bonding Using Solder Glass Frit. J. Electron. Mater. 2004;33(12):1516-23.

Tian et al., Inherent potential of steelmaking to contribute to decarbonisation targets via industrial carbon capture and storage. Nature Communications. 2018;9:4422. 8 pages.

(56) References Cited

OTHER PUBLICATIONS

Veawab et al., Corrosion Behavior of Carbon Steel in the CO2 Absorption Process Using Aqueous Amine Solutions. Ind. Eng. Chem. Res. 1999;38:3917-24. Epub Sep. 8, 1999.

Venegas et al., Kinetic and Reaction Mechanism of CO2 Sorption on Li4SiO4: Study of the Particle Size Effect. Ind. Eng. Chem. Res. 2007;46:2407-12. Epub Mar. 9, 2007.

Veneman et al., Continuous CO2 Capture in a Circulating Fluidized Bed Using Supported Amine Sorbents. Chem. Eng. J. 2012;207-208:18-26. Epub Jun. 30, 2012.

Wachi et al., Mass Transfer with Chemical Reaction and Precipitation. Chem. Eng. Sci. 1991;46:1027-33.

Wang et al., Amine reclaiming technologies in post-combustion carbon dioxide capture. Journal of Environmental Sciences. 2015;27:276-89. Epub Nov. 12, 2014.

Wang et al., Recent advances in solid sorbents for CO 2 capture and new development trends. Energy & Environmental Science. 2014;7:3478-518. Author manuscript provided. 46 pages.

Wang et al., Subpilot Demonstration of the Carbonation-Calcination Reaction (CCR) Process: High-Temperature CO2 and Sulfur Capture from Coal-Fired Power Plants. Industrial & Engineering Chemistry Research. 2010;49:5094-101. Epub Feb. 17, 2010.

Wang et al., Synthesis of High-Temperature CO2 Adsorbents from Organo-Layered Double Hydroxides with Markedly Improved CO2 Capture Capacity. Energy Environ. Sci. 2012;5:7526-30.

Wang et al., Thermodynamic Optimization of the Na2O—B2O3 Pseudo-Binary System. J. Phase Equilibria. 2003;24(1):12-20.

Watkins et al., Diffusion of Multi-Isotopic Chemical Species in Molten Silicates. Geochim. Cosmochim. Acta. 2014;139:313-26. Epub May 9, 2014.

Weiland et al., Effect of Heat-Stable Salts on Amine Absorber and Regenerator Performance. Conference Proceedings Presented at Fall Meeting of AIChE, Austin, Texas. Nov. 7, 2004:13 pages.

Wieckol-Ryk et al., Analysis of Biomass Blend Co-Firing for Post Combustion CO2 Capture. Sustainability. 2018;10:923. 15 pages. Epub Mar. 22, 2018.

Xiang et al., Experimental and Modeling Studies on Sulfur Trioxide of Flue Gas in a Coal-Fired Boiler. Energy & Fuels. 2017;31:6284-97. Epub May 16, 2017.

Xiao et al., A Citrate Sol-gel Method to Synthesize Li2ZrO3 Nanocrystals with Improved CO2 Capture Properties. J. Mater. Chem. 2011;21:3838-42.

Xu et al., Mathematically modeling fixed-bed adsorption in aqueous systems. Journal of Zhejiang University—Science A. 2013;14(3):155-76.

Yi et al., Continuous Operation of the Potassium-Based Dry Sorbent CO2 Capture Process with Two Fluidized-Bed Reactors. Int. J. Greenh. Gas Control. 2007;1:31-6. Epub Feb. 21, 2007.

Yin et al., Calcium Looping for CO2 Capture at a Constant High Temperature. Energy & Fuels. 2014;28:307-18. Epub Sep. 13, 2013.

Yin et al., High-Temperature Pressure Swing Adsorption Process for CO2 Separation. Energy & Fuels. 2012;26:169-75. Epub Oct. 26, 2011.

Yu et al., Nitrosamines and Nitramines in Amine-Based Carbon Dioxide Capture Systems: Fundamentals, Engineering Implications, and Knowledge Gaps. Environmental Science & Technology. 2017;51:11522-36. Epub Sep. 25, 2017.

Yun, Unusual adsorber dynamics due to S-shaped equilibrium isotherm. Korean Journal of Chemical Engineering. 2000;17(5):613-7.

Zhang et al., Phase Transfer-Catalyzed Fast CO2 Absorption by MgO-Based Absorbents with High Cycling Capacity. Adv. Mater. Interfaces. 2014;1:1400030. 6 pages.

Zhu et al., System and Processes of Pre-Combustion Carbon Dioxide Capture and Separation. In Pre-combustion Carbon Dioxide Capture Materials; Wang, Q., Ed.; Royal Society of Chemistry. London, United Kingdom. 2018:281-334.

U.S. Appl. No. 17/090,146, filed Nov. 5, 2020, Hatton et al.
U.S. Appl. No. 17/090,180, filed Nov. 5, 2020, Hatton et al.
PCT/US2019/040961, Apr. 15, 2021, International Preliminary Report on Patentability.

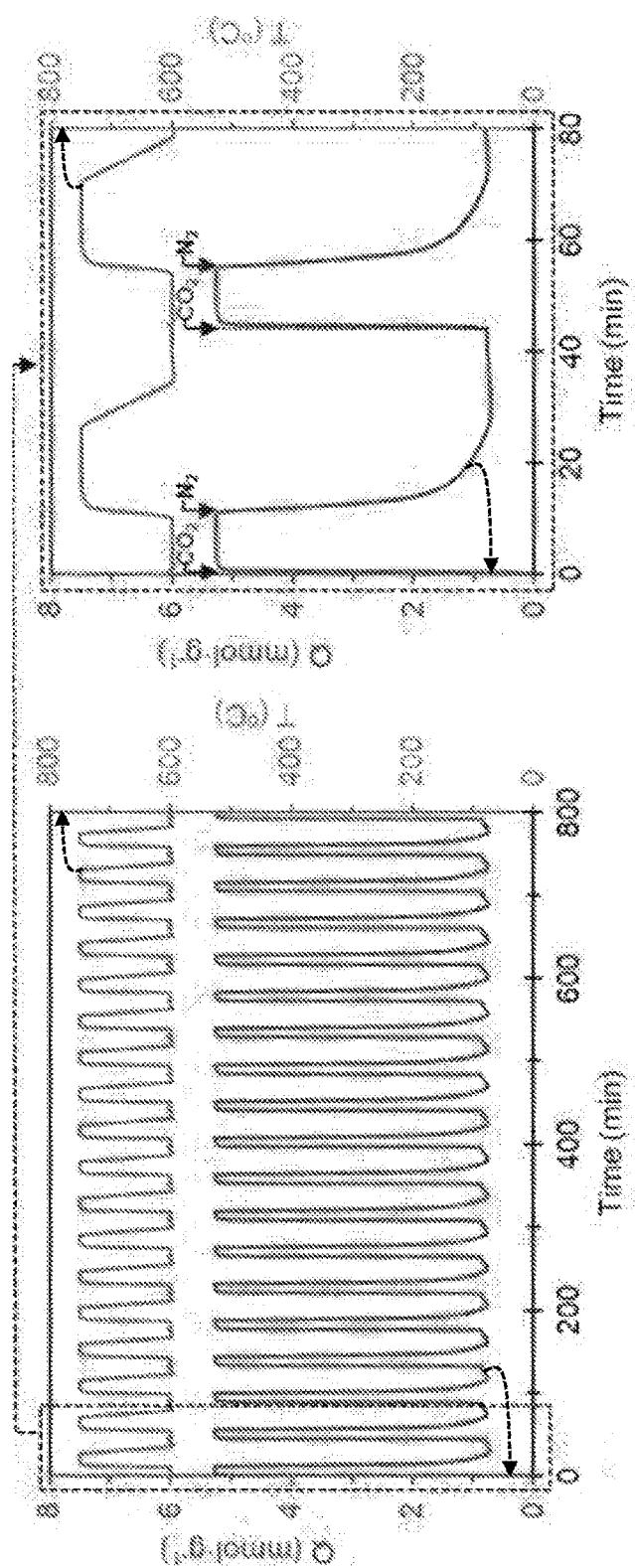

CARBON DIOXIDE REMOVAL USING SEQUESTRATION MATERIALS THAT INCLUDE SALTS IN MOLTEN FORM, AND RELATED SYSTEMS AND METHODS

RELATED APPLICATIONS

This application is a national stage filing under 35 U.S.C. § 371 of International Patent Application No. PCT/US2019/040961, filed Jul. 9, 2019, and entitled "Carbon Dioxide Removal Using Sequestration Materials that Include Salts in Molten Form, and Related Systems and Methods," which claims priority under 35 U.S.C. § 119(e) to U.S. Provisional Application No. 62/742,078, filed Oct. 5, 2018, and entitled "Carbon Dioxide Removal Using Sequestration Materials that Include Salts in Molten Form, and Related Systems and Methods," and to U.S. Provisional Application No. 62/815,656, filed Mar. 8, 2019, and entitled "Carbon Dioxide Removal Using Sequestration Materials that Include Salts in Molten Form, and Related Systems and Methods," each of which is incorporated herein by reference in its entirety for all purposes.

TECHNICAL FIELD

The removal of carbon dioxide ($CO_2$) using sequestration materials that include salts in molten form, and related systems and methods, are generally described.

SUMMARY

Carbon dioxide removal using sequestration materials that include salts in molten form, and related systems and methods, are generally described. Methods of capturing carbon dioxide using sequestration materials are described, which in some embodiments involve exposing a sequestration material to an environment containing carbon dioxide such that at least some of the carbon dioxide interacts with the sequestration material and is sequestered from the environment. In some cases, the sequestration material is at a temperature of at least 200 degrees Celsius (° C.) during exposure to the environment containing carbon dioxide. Certain embodiments are related to sequestration materials comprising a salt in molten form, which salt in molten form comprises at least one alkali metal cation and at least one boron oxide anion and/or a dissociated form thereof. In certain embodiments, the constituent elements (boron (B) and oxygen (O)) of the at least one boron oxide anion have dissociated into, e.g., ionic form (e.g., $B^{3+}$ and $O^{2-}$ respectively).

According to certain embodiments, the sequestration materials can capture carbon dioxide at a relatively rapid rate. In some embodiments, the sequestration material can be cycled repeatedly while losing little if any ability to sequester carbon dioxide.

The subject matter of the present invention involves, in some cases, interrelated products, alternative solutions to a particular problem, and/or a plurality of different uses of one or more systems and/or articles.

Certain aspects are directed to a method. In some embodiments, the method comprises exposing a sequestration material, comprising a salt in molten form, to an environment containing carbon dioxide such that at least some of the carbon dioxide interacts with the sequestration material and is sequestered from the environment, wherein the salt in molten form comprises: at least one alkali metal cation; boron; and oxygen. In some embodiments, the boron is in the form of at least one boron cation (e.g., comprising $B^{3+}$). In some embodiments, the oxygen is in the form of at least one oxygen anion (e.g., comprising $O^{2-}$).

In some embodiments, the method comprises exposing a sequestration material, comprising a salt in molten form, to an environment containing carbon dioxide such that at least some of the carbon dioxide interacts with the sequestration material and is sequestered from the environment, wherein the salt in molten form comprises: at least one alkali metal cation; and at least one boron oxide anion and/or a dissociated form thereof. In some embodiments, the temperature of the sequestration material is at least 200° C. during at least a portion of the sequestration of the carbon dioxide.

In some embodiments, a method comprises melting a sequestration material comprising a salt (e.g., an alkali metal borate), and using the molten sequestration material to sequester carbon dioxide.

In some embodiments, a method comprises exposing a carbon dioxide sequestration material at a temperature of at least 200° C. to an environment containing carbon dioxide such that at least some of the carbon dioxide interacts with the sequestration material and is sequestered from the environment.

In some embodiments, a method comprises exposing a sequestration material, comprising a salt in molten form, to an environment containing carbon dioxide such that at least some of the carbon dioxide interacts with the sequestration material and is sequestered from the environment, under conditions such that at least the unreacted molten salt remains in molten form.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

In the figures:

FIG. 4A is a plot showing the cyclic regenerability of a sequestration material by a temperature-swing method, according to certain embodiments;

FIG. 4B is a plot of the first eighty minutes of FIG. 4A, according to certain embodiments;

DETAILED DESCRIPTION

Figure 1:
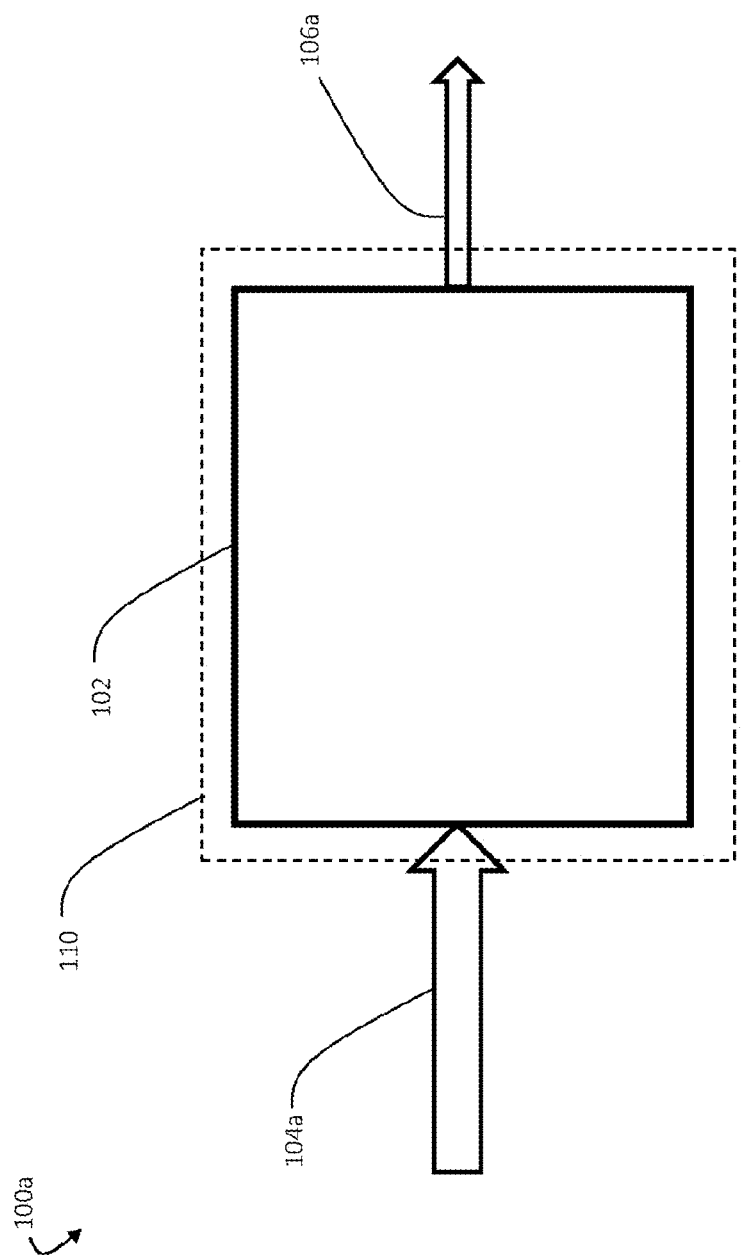
FIG. 1 is, in accordance with certain embodiments, a schematic diagram of a sequestration material being exposed to an environment containing carbon dioxide.

The present disclosure is directed to the removal of carbon dioxide using sequestration materials that include salts in molten form. In some embodiments, the removal of the carbon dioxide may occur at an elevated temperature (e.g., at or above the melting temperature of the salt, such that at least the unreacted molten salt remains in molten form).

According to certain embodiments of the invention, the salt is exposed to the carbon dioxide under conditions favoring sequestration. For example, in accordance with certain embodiments, a sequestration material that comprises a salt in molten form can be exposed to the environment containing carbon dioxide in a manner facilitating high contact between the two, e.g., the sequestration material can be flowed (optionally flowed continuously) and/or sprayed during exposure of the sequestration material to an environment containing carbon dioxide. The flowing and/or spraying of the sequestration material, during exposure of the sequestration material to an environment containing carbon dioxide, may advantageously increase the rate of carbon dioxide capture by the sequestration material relative to the rate of carbon dioxide capture by an entirely solid sequestration material. For example, the sequestration material (also referred to herein as a sorbent) comprising a salt in molten form may be flowed and/or sprayed in one direction while an environment comprising carbon dioxide is flowed in a different direction, e.g., in the opposite direction, in a crosscurrent or countercurrent type operation to maximize heat and/or mass transfer between the sequestration material and the environment.

Uptake of carbon dioxide by a sequestration material in accordance with certain embodiments of the invention can be at desirable levels. Uptake by a sequestration material comprising a salt in molten form, with the salt including an alkali metal cation and a boron oxide anion and/or a dissociated form thereof, may be as much as or greater than 5 mmol of carbon dioxide per gram of sequestration material within 1 minute of exposure to an environment containing carbon dioxide, a significantly faster rate of uptake than for solid particulate sequestration materials of similar composition under similar conditions.

In addition, the ability to flow the sequestration material comprising a salt in molten form facilitates, in accordance with certain embodiments, a continuous carbon dioxide sequestration process, in which a carbon dioxide loaded sequestration material can be flowed from an adsorber vessel to a desorber vessel, and/or an unloaded sequestration material can be flowed from the desorber vessel to the adsorber vessel, for a plurality of cycles without halting the process. Continuous operation provides, in some embodiments, advantages including but not limited to a reduced duration of a carbon dioxide capture process, potentially reduced energy input required in the carbon dioxide capture process, and the ability to refresh poisoned sequestration material with a purge rather than taking a unit offline.

Another important advantage to a sequestration material comprising a salt in molten form, in accordance with certain embodiments, is the ability to use the sequestration material at an elevated temperature, e.g., at a temperature greater than or equal to the melting temperature of the sequestration material, e.g., greater than or equal to 200° C. The temperature can be higher as well, e.g., greater than or equal to 250° C., greater than or equal to 300° C., greater than or equal to 350° C., greater than or equal to 400° C., greater than or equal to 450° C., or greater than or equal to 500° C., or higher. In some embodiments in which the sequestration material is used at an elevated temperature, any of a variety of suitable amounts of the sequestration material (e.g., greater than or equal to 1 wt %, greater than or equal to 10 wt %, greater than or equal to 50 wt %, greater than or equal to 75 wt %, greater than or equal to 90 wt %, greater than or equal to 99 wt %, or all of the sequestration material) will be at that elevated temperature (e.g., greater than or equal to 200° C., greater than or equal to 250° C., greater than or equal to 300° C., greater than or equal to 350° C., greater than or equal to 400° C., greater than or equal to 450° C., greater than or equal to 500° C., and/or within any of the other temperature ranges mentioned above or elsewhere herein). In certain embodiments, the process can optionally take place in a pressure swing operation. As used herein, temperature of operation refers to the temperature of the sequestration material itself, which can be essentially equal to or different from the temperature of the environment to which the sequestration material is exposed.

Generally, in a pressure swing operation in certain embodiments described herein, the sequestration material is exposed to an environment having a first partial pressure of carbon dioxide, during exposure of the sequestration material to an environment containing carbon dioxide, and subsequently the carbon-dioxide loaded sequestration material is exposed to a second environment having second lower partial pressure of carbon dioxide (e.g., 0 bar $CO_2$), regenerating unloaded sequestration material. This pressure swing operation may be repeated for a plurality of cycles once the sequestration material has been regenerated. The first partial pressure of $CO_2$ may be at least 0.001 bar, at least 0.01 bar, at least 0.1 bar, or at least 1 bar. The first partial pressure of $CO_2$ may be at most 30 bar, at most 20 bar, at most 10 bar, or at most 5 bar. Combinations of the above-referenced ranges are also possible (e.g., between or equal to 0.001 bar and 30 bar, between or equal to 0.01 bar and 20 bar, between or equal to 0.1 bar and 10 bar, between or equal to 1 bar and 5 bar). Other ranges are also possible. The second partial pressure of $CO_2$ may be less than the first partial pressure of $CO_2$ by at least 0.001 bar, at least 0.01 bar, at least 0.1 bar, or at least 1 bar. The second partial pressure of $CO_2$ may be less than the first partial pressure of $CO_2$ by at most 30 bar, at most 20 bar, at most 10 bar, or at most 5 bar. Combinations of the above-referenced ranges are also possible (e.g., between or equal to 0.001 bar and 30 bar less, between or equal to 0.01 bar and 20 bar less, between or equal to 0.1 bar and 10 bar less, between or equal to 1 bar and 5 bar less). Other ranges are also possible.

The process can optionally take place in a temperature swing operation. Generally in a temperature swing operation, in accordance with certain embodiments described herein, the sequestration material is exposed to a first temperature, during exposure of the sequestration material to an environment containing carbon dioxide, and subsequently the carbon-dioxide loaded sequestration material is exposed to a second higher temperature in a second environment containing less or no carbon dioxide, regenerating unloaded sequestration material. This temperature swing operation may be repeated for a plurality of cycles once the sequestration material has been regenerated. The first temperature may be greater than or equal to the melting temperature of the sequestration material, e.g., greater than or equal to 200° C. The first temperature can be higher as well, e.g., greater than or equal to 250° C., greater than or equal to 300° C., greater than or equal to 350° C., greater than or equal to 400° C., greater than or equal to 450° C., or greater than or equal to 500° C., or higher, and/or less than or equal to 700° C. In some embodiments, the second temperature is equal to the first temperature. The second temperature may be greater than the first temperature by at least 10° C., at least 20° C., at least 30° C., at least 40° C., or at least 50° C. The second temperature may be greater than the first temperature by at most 300° C., at most 200° C., at most 100° C., at most 90° C., at most 80° C., at most 70° C., or at most 60° C. Combinations of the above-referenced ranges are also possible (e.g., between or equal to 10° C. and 300° C. greater, between or equal to 20° C. and 200° C. greater, between or equal to 40° C. and 100° C. greater). Other ranges are also possible.

It is noted that, in certain embodiments, unless specified otherwise, temperatures and other conditions described herein are at approximately atmospheric pressure, although deviation from atmospheric pressure can occur while still meeting the objectives disclosed herein. Those of ordinary skill, given the present disclosure, can select different pressures to achieve the results outlined herein.

Certain embodiments are related to a sequestration material. As used herein, the phrase "sequestration material" is used to describe a material that is capable of removing carbon dioxide from a carbon-dioxide-containing environment.

Certain aspects are related to a sequestration material that comprises a salt in molten form, the composition of which salt can be selected to have a low melting temperature relative to other salts such that less energy is required to melt the salt. In addition, the composition of the salt can be selected in order to tune the melting point (e.g., melting temperature at 1 atm) of the salt, e.g., to approach or match the temperature at which the carbon dioxide, to which the salt is exposed, is emitted from a source of carbon dioxide. In certain embodiments, the salt is in molten form. For example, in some embodiments, a solid salt comprising an alkali metal cation and a boron oxide anion (and/or a dissociated form thereof) can be heated above its melting temperature which results in the solid transitioning into a liquid state. According to certain embodiments, the salt comprising an alkali metal cation and a boron oxide anion (and/or a dissociated form thereof) is a salt having a melting point between or equal to 200° C. and 700° C. when at atmospheric pressure. Those of ordinary skill in the art would understand that a molten salt is different from a solubilized salt (i.e., a salt that has been dissolved within a solvent).

The salt in molten form can have a number of chemical compositions. According to certain embodiments, the salt in molten form comprises at least one alkali metal cation and at least one boron oxide anion and/or a dissociated form thereof.

The term "alkali metal" is used herein to refer to the following six chemical elements of Group 1 of the periodic table: lithium (Li), sodium (Na), potassium (K), rubidium (Rb), cesium (Cs), and francium (Fr).

In some embodiments, the at least one alkali metal cation comprises cationic lithium (Li), sodium (Na), potassium (K), rubidium (Rb), and/or cesium (Cs). In some embodiments, the at least one alkali metal cation comprises cationic lithium (Li), sodium (Na), and/or potassium (K).

In some embodiments, the salt in molten form comprises at least one other metal cation. In some embodiments, the at least one other metal cation comprises an alkali metal cation, an alkaline earth metal cation, or a transition metal cation. In some embodiments, the salt in molten form comprises at least two alkali metal cations (e.g., 3 alkali metal cations). In certain embodiments, the salt in molten form comprises cationic lithium and cationic sodium.

A salt in molten form comprising cationic lithium and cationic sodium may in some embodiments provide advantages in a temperature swing operation, e.g., relative to an analogous salt in molten form comprising cationic sodium or an analogous salt in molten form comprising cationic lithium, cationic sodium, and cationic potassium. One advantage of a salt in molten form comprising cationic lithium and cationic sodium may be a higher carbon dioxide uptake capacity, in a temperature range of between or equal to 500° C. and 700° C., than an analogous salt in molten form comprising cationic sodium or an analogous salt in molten form comprising cationic lithium, cationic sodium, and cationic potassium. Another advantage of a salt in molten form comprising cationic lithium and cationic sodium may be that a lesser temperature difference can be employed in a temperature swing operation for the same regeneration efficiency of carbon dioxide capture and release (e.g., a temperature difference of between or equal to 0.25 and 0.5 times the temperature difference employed for analogous salts) relative to an analogous salt in molten form comprising cationic sodium or an analogous salt in molten form comprising cationic lithium, cationic sodium, and cationic potassium.

The term "alkaline earth metal" is used herein to refer to the six chemical elements in Group 2 of the periodic table: beryllium (Be), magnesium (Mg), calcium (Ca), strontium (Sr), barium (B a), and radium (Ra).

The "transition metal" elements are scandium (Sc), yttrium (Y), lanthanum (La), actinium (Ac), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), manganese (Mn), technetium (Tc), rhenium (Re), bohrium (Bh), iron (Fe), ruthenium (Ru), osmium (Os), hassium (Hs), cobalt (Co), rhodium (Rh), iridium (Ir), meitnerium (Mt), nickel (Ni), palladium (Pd), platinum (Pt), darmstadtium (Ds), copper (Cu), silver (Ag), gold (Au), roentgenium (Rg), zinc (Zn), cadmium (Cd), mercury (Hg), and copernicium (Cn).

In certain embodiments, it may be advantageous for the salt in molten form to comprise an alkali metal cation and one other metal cation at a composition at or near a eutectic composition, such that the melting temperature of the salt is lower than the melting temperature of a salt with a different composition of the alkali metal cation and the one other metal cation, reducing the energy required to attain the salt in molten form for a carbon dioxide sequestration operation.

Certain of the sequestration materials described herein have relatively low melting temperatures and may promote sequestration (e.g., absorption) of carbon dioxide at relatively low temperatures. For example, components that are capable of forming eutectic compositions with each other have reduced melting points at the eutectic composition and at compositions surrounding the eutectic composition in comparison to compositions in which the components are present in other relative amounts. As another example, compositions comprising alkali metal cations and/or alkaline earth metal cations have relatively low melting points in comparison to compositions comprising other metal cations. The ability to absorb carbon dioxide at relatively low temperatures can be advantageous as it may, according to certain although not necessarily all embodiments, reduce the amount of energy required to absorb carbon dioxide.

In some embodiments the sequestration material comprises at least two components (e.g., metal cations, alkali metal cation(s)) that are capable of forming a eutectic composition with each other. As would be understood by one of ordinary skill in the art, a "eutectic composition" is a composition that melts at a temperature lower than the melting points of the composition's constituents. In some eutectic compositions, the liquid phase is in equilibrium with both a first solid phase and a second solid phase different from the first solid phase at the eutectic temperature. A eutectic composition that is cooled from a temperature above the eutectic temperature to a temperature below the eutectic temperature under equilibrium cooling conditions undergoes, in certain cases, solidification at the eutectic temperature to form a first solid phase and a second solid phase simultaneously from a liquid. As would also be understood by one of ordinary skill in the art, two components that are capable of forming a eutectic composition with each other are, in certain cases, also able to form non-eutectic compositions with each other. Non-eutectic compositions often undergo solidification over a range of temperatures because liquid phases may be in equilibrium with solid phases over a range of temperatures.

The term "boron oxide anion" is used herein to refer to a negatively charged ion comprising at least one boron and at least one oxygen. The boron oxide anion in the salt in molten form can be intact (e.g., in anionic $B_wO_z$ form, e.g., ($BO_3^{3-}$)) and/or the boron and oxygen can be dissociated from one another (e.g., into boron cation(s) and oxygen anion(s), e.g., as $B^{3+}$ and $O^{2-}$.

According to some embodiments, the at least one boron oxide anion comprises anionic $B_wO_z$ and/or a dissociated form thereof. In some embodiments, w is greater than 0 and less than or equal to 4. In certain embodiments, w is between or equal to 1 and 4. In some embodiments, z is greater than 0 and less than or equal to 9. In certain embodiments, z is between or equal to 1 and 9. In some embodiments, the at least one boron oxide anion comprises anionic $BO_3$, $BO_4$, or $B_2O_5$ and/or a dissociated form thereof. In certain embodiments, it may be advantageous to have a salt in molten form comprise anionic $BO_3$ and/or a dissociated form thereof. A potential advantage of anionic $BO_3$ and/or a dissociated form thereof may include a greater carbon dioxide uptake capacity of the salt in molten form during exposure to an environment containing carbon dioxide, relative to a salt having the same alkali metal cation (and any other cations) and anionic $B_2O_5$ and/or a dissociated form thereof. Another potential advantage of anionic $BO_3$ and/or a dissociated form thereof may include a greater carbon dioxide desorption of the salt in molten form during exposure to desorption conditions, relative to a salt having the same alkali metal cation (and any other cations) and anionic $BO_4$ and/or a dissociated form thereof.

In some embodiments, the boron oxide anion comprises $B_wO_z$ and/or a dissociated form thereof, wherein w is greater than 0 and less than or equal to 4 and z is greater than 0 and less than or equal to 9.

In some embodiments, the fractional stoichiometry of a salt described herein can be expressed as $M_xB_{1-x}O_y$, wherein x is a mixing ratio and is between zero and 1. In some embodiments, the fractional stoichiometry is that of the salt in solid form, e.g., before melting. In some embodiments, the fractional stoichiometry is that of the salt in molten form, e.g., after melting. In certain embodiments, $y=1.5-x$. "M" in this formula refers to the metal cation(s) (e.g., an alkali metal cation, a combination of an alkali metal cation and at least one other metal cation) in a sequestration material described herein. For example, in some embodiments, the fractional stoichiometry of a salt described herein can be expressed as $A_xB_{1-x}O_y$, where $0<x<1$ and A is an alkali metal (e.g., Li, Na, K). In certain embodiments, $y=1.5-x$.

As used herein, the term "mixing ratio" of an alkali metal cation or combination of metal cations in a sequestration material refers to the ratio of moles of metal cation(s) in a sequestration material to the total of moles of metal cation(s) plus moles of boron in the sequestration material. For example, the mixing ratio of sodium in $Na_3BO_3$ is $3/(3+1)=0.75$; the mixing ratio of alkali metals in $(Li_{0.5}Na_{0.5})_3BO_3$ is $(0.5*3+0.5*3)/(3+1)=0.75$. In some embodiments, the mixing ratio is at least 0.5, at least 0.6, or at least 0.667. In some embodiments, the mixing ratio is at most 0.9, at most 0.835, at most 0.8, at most 0.75, or at most 0.7. Combinations of the above-referenced ranges are also possible (e.g., between or equal to 0.5 and 0.9, between or equal to 0.6 and 0.8, between or equal to 0.7 and 0.8). Other ranges are also possible. Without wishing to be bound by theory, there may be a mixing ratio (for a certain alkali metal cation or combination of metal cations) below which the carbon dioxide uptake capacity of the sequestration material is less than desirable. Without wishing to be bound by theory, there may be a mixing ratio (for a certain alkali metal cation or combination of metal cations) above which the regeneration efficiency of the sequestration material is less than desirable.

Non-limiting examples of the salt in molten form include but are not limited to $Na_3BO_3$ (which could also be written as, e.g., $Na_{0.75}B_{0.25}O_{0.75}$), $Na_5BO_4$ (which could also be written as, e.g., $Na_{0.83}B_{0.17}O_{0.67}$), $Na_4B_2O_5$ (which could also be written as, e.g., $Na_2BO_{2.5}$), $K_3BO_3$ (which could also be written as, e.g., $K_{0.75}B_{0.25}O_{0.75}$), $(Li_{0.5}Na_{0.5})_3BO_3$, and/or $(Li_{0.33}Na_{0.33}K_{0.33})_3BO_3$, or a combination thereof, in molten form.

In some embodiments, less than 1 wt % of the sequestration material is made up of a salt comprising a nitrate and/or a nitrite.

In some embodiments, the salt of the sequestration material that is in molten form may be accompanied by portions of that salt that are not molten. That is to say, complete melting of all of the salt type(s) that are present in molten form is not required in all embodiments. In some embodiments, at least 10 wt %, at least 20 wt %, at least 30 wt %, at least 40 wt %, at least 50 wt %, at least 60 wt %, at least 70 wt %, at least 80 wt %, at least 90 wt %, or more of the salt present within the sequestration material is molten. In some embodiments, less than 100 wt %, less than 99 wt %, less than 90 wt %, or less of the salt that is present within the sequestration material is molten. Combinations of the above-referenced ranges are also possible. Other ranges are also possible.

In some embodiments, the sequestration material comprises at least one salt comprising at least one alkali metal cation and at least one boron oxide anion and/or a dissociated form thereof (e.g., including, but not limited to, $Na_3BO_3$, $Na_5BO_4$, $Na_4B_2O_5$, $K_3BO_3$, $(Li_{0.5}Na_{0.5})_3BO_3$, and/or $(Li_{0.33}Na_{0.33}K_{0.33})_3BO_3$) for which at least 10 wt %, at least 20 wt %, at least 30 wt %, at least 40 wt %, at least 50 wt %, at least 60 wt %, at least 70 wt %, at least 80 wt %, at least 90 wt %, or more of that salt is molten. In some embodiments, the sequestration material comprises at least one salt comprising at least one alkali metal cation and at least one boron oxide anion and/or a dissociated form thereof (e.g., including, but not limited to, $Na_3BO_3$, $Na_5BO_4$, $Na_4B_2O_5$, $K_3BO_3$, $(Li_{0.5}Na_{0.5})_3BO_3$, and/or $(Li_{0.33}Na_{0.33}K_{0.33})_3BO_3$) for which less than 100 wt %, less than 99 wt %, less than 90 wt %, or less of that salt is molten. Combinations of the above-referenced ranges are also possible. Other ranges are also possible.

In some embodiments, in the sequestration material, the total amount of all salts that comprise at least one alkali metal cation and at least one boron oxide anion and/or a dissociated form thereof and that is in molten form is at least 10 wt %, at least 20 wt %, at least 30 wt %, at least 40 wt %, at least 50 wt %, at least 60 wt %, at least 70 wt %, at least 80 wt %, at least 90 wt %, or more. As a non-limiting exemplary illustration, in some embodiments, the sequestration material can be a combination of 50 grams of $Na_3BO_3$, 50 grams of $Na_5BO_4$, and 50 grams of $Na_4B_2O_5$, and in some such embodiments, at least 15 grams (i.e., 10 wt % of 150 total grams) of the total amount of $Na_3BO_3$, $Na_5BO_4$, and $Na_4B_2O_5$ is molten. In certain embodiments, in the sequestration material, the total amount of all salts that comprise at least one alkali metal cation and at least one boron oxide anion and/or a dissociated form thereof and that is in molten form is less than 100 wt %, less than 99 wt %, less than 90 wt %, less than 50%, less than 40%, less than 30%, less than 20%, or less. Combinations of the above-referenced ranges are also possible. Other ranges are also possible.

In some embodiments, a sequestration material further comprises an additive. Examples of types of additives that may be included in a sequestration material include but are not limited to corrosion inhibitors, viscosity modifiers, wetting agents, high-temperature surfactants, and scale inhibitors. In some embodiments, the sequestration material comprises a plurality of additives (e.g., two, three, four, or more).

In some embodiments, during exposure to an environment comprising carbon dioxide, at least a portion of the salt in molten form chemically reacts with at least some of the carbon dioxide and forms one or more products (e.g., comprising a carbonate) within the sequestration material. These one or more products (e.g., carbonate products) may be in solid form or in liquid form, depending, e.g., on the temperature and/or composition of the salt (e.g., alkali metal borate).

In some embodiments, during exposure to an environment comprising carbon dioxide, at least a portion of the salt in molten form chemically reacts with at least some of the carbon dioxide and forms solid particles (e.g., comprising a carbonate) within the sequestration material, increasing the viscosity of the sequestration material. These carbon dioxide-loaded solid particles may be flowed within remaining salt in molten form using a slurry pump to a desorber to be regenerated (e.g., regeneration of salt in molten form from the solid particulates), or alternatively these solid particles may be regenerated within the same vessel in which the solid particles were formed.

In some embodiments, a relatively large percentage of the sequestration material is made up of a salt in molten form. For example, in some embodiments, at least 10 weight percent (wt %), at least 20 wt %, at least 30 wt %, at least 40 wt %, at least 50 wt %, at least 60 wt %, at least 70 wt %, at least 80 wt %, at least 90 wt %, or more of the sequestration material is made up of a salt in molten form. In some embodiments, at most 100 wt %, at most 99 wt %, or at most 90 wt % of the sequestration material is made up of a salt in molten form. Combinations of the above-referenced ranges are also possible (e.g., between or equal to 10 wt % and 100 wt %, between or equal to 20 wt % and 99 wt %, between or equal to 50 wt % and 90 wt %). Other ranges are also possible. In some embodiments, all of the sequestration material is molten. In other embodiments, only a portion of the sequestration material is molten.

In some embodiments, a relatively large percentage of the sequestration material is chemically converted to carbon dioxide-loaded solid particles during sequestration (e.g., absorption). For example, in some embodiments, at least 1 wt %, at least 10 wt %, or at least 20 wt % of the sequestration material is made up of carbon dioxide-loaded solid particles. In some embodiments, at most 90 wt %, at most 80 wt %, or at most 50 wt % of the sequestration material is made up of carbon dioxide-loaded solid particles. Combinations of the above-referenced ranges are also possible (e.g., between or equal to 1 wt % and 90 wt %, between or equal to 10 wt % and 80 wt %, between or equal to 10 wt % and 50 wt %, between or equal to 20 wt % and 50 wt %). Other ranges are also possible.

In some embodiments, the sequestration material also comprises a hydroxide of an alkali metal. For example, in some embodiments, the sequestration material comprises NaOH, KOH, and/or LiOH. According to certain embodiments, a hydroxide of an alkali metal can be formed as a by-product of a reaction between the sequestration material and carbon dioxide.

According to certain embodiments, the sequestration material is capable of interacting with carbon dioxide such that a relatively large amount of carbon dioxide is sequestered. Interaction between the sequestration material and carbon dioxide can involve a chemical reaction, adsorption, and/or diffusion.

For example, in certain embodiments, the sequestration material is capable of interacting with carbon dioxide such that at least 1.0 mmol of carbon dioxide is sequestered (e.g., from an environment, e.g., from an atmosphere, from a stream) per gram of the sequestration material. In some embodiments, the sequestration material is capable of interacting with carbon dioxide such that at least 2.0 mmol, at least 3.0 mmol, at least 4.0 mmol, or at least 5.0 mmol of carbon dioxide is sequestered (e.g., from an environment, e.g., from an atmosphere, from a stream) per gram of the sequestration material. In certain embodiments, the sequestration material is capable of interacting with carbon dioxide such that at most 10.0 mmol, at most 9.0 mmol, at most 8.0 mmol, at most 7 mmol, or at most 6 mmol of carbon dioxide is sequestered (e.g., from an environment, e.g., from an atmosphere, from a stream) per gram of the sequestration material. Combinations of the above-referenced ranges are also possible (e.g., between or equal to 1.0 mmol per gram and 10.0 mmol per gram, between or equal to 2.0 mmol per gram and 8.0 mmol per gram, between or equal to 4.0 mmol per gram and 7.0 mmol per gram).

According to certain embodiments, the sequestration material is capable of interacting with carbon dioxide such that a relatively large amount of carbon dioxide is sequestered even when the carbon dioxide concentration in the environment (e.g., in an atmosphere, in a stream) is relatively low. For example, in some embodiments, the sequestration material is capable of sequestering at least 1.0 mmol, at least 2.0 mmol, at least 3.0 mmol, at least 4.0 mmol, at least 5.0 mmol, and/or at most 10.0 mmol, at most 9.0 mmol, at most 8.0 mmol, at most 7 mmol, or at most 6 mmol of carbon dioxide per gram of the sequestration material when the sequestration material is exposed to a steady state environment containing as little as 50 mol %, as little as 25 mol %, as little as 10 mol %, or as little as 1 mol % carbon dioxide (e.g., with the balance of the environment being argon).

According to certain embodiments, the sequestration material is capable of interacting with carbon dioxide such that a relatively large amount of carbon dioxide is sequestered even at relatively low temperatures. For example, in some embodiments, the sequestration material is capable of sequestering at least 1.0 mmol, at least 2.0 mmol, at least 3.0 mmol, at least 4.0 mmol, at least 5.0 mmol and/or at most 10.0 mmol, at most 9.0 mmol, at most 8.0 mmol, at most 7 mmol, or at most 6 mmol of carbon dioxide per gram of the sequestration material when the sequestration material is at a temperature of 700° C. or less, at a temperature of 650° C. or less, at a temperature of 600° C. or less, at a temperature of 550° C. or less, or at a temperature of 520° C. or less (and/or, at a temperature of at least 200° C., at least 300° C., at least 400° C., at least 450° C., or at least 500° C.). Combinations of the above-referenced ranges are also possible (e.g., between or equal to 200° C. and 700° C., between or equal to 200° C. and 600° C., between or equal to 400° C. and 550° C.). Other ranges are also possible.

According to certain embodiments, the salt of the sequestration material has a melting temperature at 1 atm within a range high enough to provide a high rate of carbon dioxide sequestration, but not so high as to make carbon dioxide sequestration an overly energy-intensive process. In some embodiments, the salt of the sequestration material has a melting temperature at 1 atm of at least 200° C., at least 300° C., at least 400° C., at least 450° C., or at least 500° C. In some embodiments, the salt of the sequestration material has a melting temperature at 1 atm of at most 700° C., at most 650° C., at most 600° C., at most 550° C., or at most 520° C. Combinations of the above-referenced ranges are also possible (e.g., between or equal to 200° C. and 700° C., between or equal to 200° C. and 600° C., between or equal to 400° C. and 550° C.). Other ranges are also possible.

According to certain embodiments, the sequestration material is capable of interacting with carbon dioxide such that a relatively large amount of carbon dioxide is sequestered over a relatively short period of time. For example, in some embodiments, the sequestration material is capable of sequestering at least 1.0 mmol, at least 2.0 mmol, at least 3.0 mmol, at least 4.0 mmol, at least 5.0 mmol and/or at most 10.0 mmol, at most 9.0 mmol, at most 8.0 mmol, at most 7 mmol, or at most 6 mmol of carbon dioxide per gram of the sequestration material when the sequestration material is exposed to an environment containing the carbon dioxide for a period of 24 hours or less, 12 hours or less, 8 hours or less, 4 hours or less, 1 hour or less, 30 minutes or less, 10 minutes or less, or 2 minutes or less (and/or, at least 10 seconds, at least 20 seconds, at least 30 seconds, or at least 1 minute). Combinations of the above-referenced ranges are also possible (e.g., between or equal to 10 seconds and 24 hours, between or equal to 20 seconds and 12 hours, between or equal to 30 seconds and 8 hours, between or equal to 1 minute and 4 hours, between or equal to 1 minute and 10 minutes, between or equal to 1 minute and 2 minutes). Other ranges are also possible.

The amount of carbon dioxide sequestered by a sequestration material can be determined, for example, using thermogravimetric analysis.

In addition to sequestration materials, methods of capturing carbon dioxide using sequestration materials are also described. For example, certain of the sequestration materials described herein can be used to remove carbon dioxide from a chemical process stream (e.g., the exhaust stream of a combustion system) and/or from an environment containing carbon dioxide (e.g., an environment within a reactor or other unit operation).

In some embodiments, a method comprises melting a solid sequestration material comprising a salt described herein (e.g., an alkali metal borate), and using the molten sequestration material to sequester carbon dioxide. In some embodiments, the salt (e.g., alkali metal borate) in molten form comprises an alkali metal cation, a boron oxide anion, a boron cation, and/or an oxygen anion. In certain embodiments, all of these species are present in the salt in molten form. In some embodiments, the salt (e.g., alkali metal borate) in molten form comprises an alkali metal cation, a boron cation, and an oxygen anion.

Certain aspects are related to methods of sequestering $CO_2$ using a sequestration material described herein. Certain aspects are directed to a method comprising exposing a sequestration material described herein to an environment containing carbon dioxide such that at least some of the carbon dioxide interacts with the sequestration material and is sequestered from the environment. In certain embodiments, a method comprises exposing a sequestration material at a temperature of at least 200° C. to an environment containing carbon dioxide such that at least some of the carbon dioxide interacts with the sequestration material and is sequestered from the environment.

The sequestration material can be exposed to an environment containing carbon dioxide in a number of ways. For example, in some embodiments, the sequestration material can be added to an environment (e.g., an atmosphere, a stream) containing the carbon dioxide. According to certain embodiments, the environment containing carbon dioxide can be transported into (e.g., flowed through) a container holding the sequestration material. In certain embodiments, the sequestration material comprising a salt in molten form can be flowed or sprayed through a container in which the environment resides and/or is flowed in the same and/or opposite direction to the flow direction or spray direction of the sequestration material. Combinations of these methods are also possible. The carbon dioxide to which the sequestration material is exposed is generally in fluidic form (e.g., in the form of a gas and/or a supercritical fluid). In certain embodiments, at least a portion of the carbon dioxide to which the sequestration material is exposed is in the form of a subcritical gas.

The environment containing carbon dioxide to which the sequestration material is exposed can be, for example, contained within a chemical processing unit operation. Non-limiting examples of such unit operations include reactors (e.g., packed bed reactors, fluidized bed reactors, falling film columns, bubble columns), separators (e.g., particulate filters, such as diesel particulate filters), and mixers. According to certain embodiments, the environment containing carbon dioxide is contained within a falling film column. According to certain embodiments, the environment containing carbon dioxide is part of and/or derived from the output of a combustion process.

Figure 2:
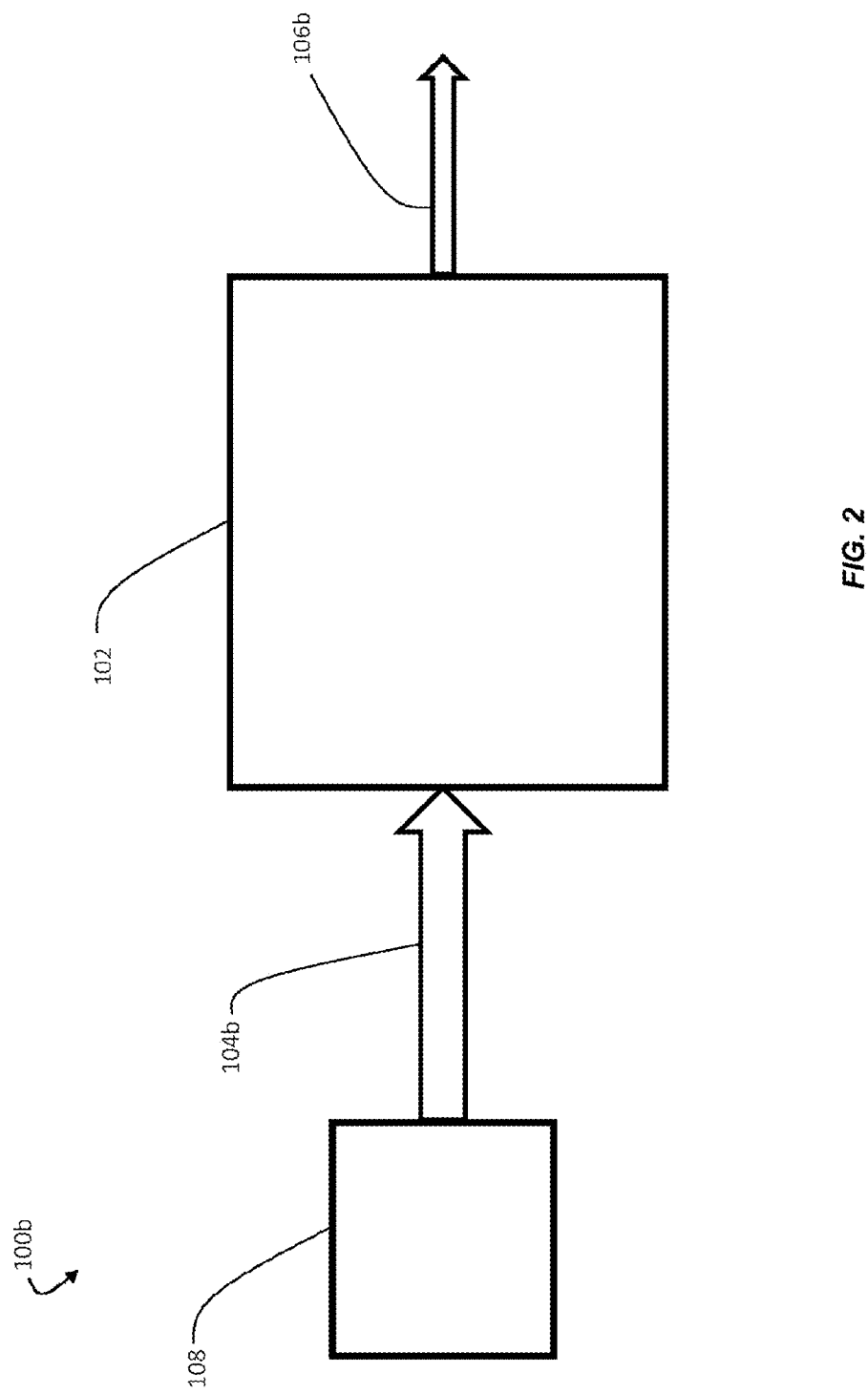
FIG. 2 is, in accordance with certain embodiments, a schematic diagram of a sequestration material being exposed to an environment containing carbon dioxide that is part of and/or derived from the output of a combustion process.

In certain embodiments, a method comprises exposing the sequestration material to a stream containing carbon dioxide. FIG. 1 is, in accordance with certain embodiments, a schematic diagram of a sequestration material being exposed to an environment containing carbon dioxide. As shown in FIG. 1, method 100a may comprise exposing sequestration material 102 to stream 104a containing carbon dioxide. The stream to which the sequestration material is exposed can be, for example, part of and/or derived from a carbon-dioxide-containing stream of a chemical process. For example, in some embodiments, the stream to which the sequestration material is exposed can be part of and/or derived from an output (e.g., an exhaust stream) of a combustion process. FIG. 2 is, in accordance with certain embodiments, a schematic diagram of a sequestration material being exposed to an environment containing carbon dioxide that is part of and/or derived from the output of a combustion process. As shown in FIG. 2, method 100b may comprise exposing sequestration material 102 to stream 104b containing carbon dioxide that is part of and/or derived from the output of combustion process 108. In some embodiments, at least a portion of an output stream of a combustion process is directly transported through the sequestration material. For example, as shown in FIG. 2, at least a portion of stream 104b of combustion process 108 is directly transported through sequestration material 102.

The stream to which the sequestration material is exposed can be, for example, transported through a chemical processing unit operation. Non-limiting examples of such unit operations include reactors (e.g., packed bed reactors, fluidized bed reactors, falling film columns, bubble columns), separators (e.g., particulate filters, such as diesel particulate filters), and mixers. For example, referring back to FIG. 1, in some embodiments, sequestration material 102 is located within optional reactor 110. According to certain embodiments, the stream to which the sequestration material is exposed is transported through a falling film column.

The sequestration materials described herein can be used to remove carbon dioxide generated by a variety of systems. For example, in some embodiments, the sequestration material is used to remove carbon dioxide from an exhaust stream from a boiler (e.g., in a power plant), from an exhaust stream from an integrated gasification combined cycle (IGCC) power plant, from an exhaust stream from an internal combustion engine (e.g., from a motor vehicle), from an exhaust stream from a pyro-processing furnace (e.g., as used in the cement industry), and/or from a stream from a hydrogen generation process (e.g., by sorption enhanced steam reforming (SESR)).

The concentration of the carbon dioxide in the fluid to which the sequestration material is exposed can be within a variety of ranges. In some embodiments, the carbon-dioxide-containing environment (e.g., an atmosphere, a stream) to which the sequestration material is exposed contains carbon dioxide in an amount of at least 1 mol %. In certain embodiments, the carbon-dioxide-containing environment (e.g., an atmosphere, a stream) to which the sequestration material is exposed contains carbon dioxide in an amount of at least 5 mol %, at least 10 mol %, at least 20 mol %, at least 30 mol %, at least 40 mol %, at least 50 mol %, at least 75 mol %, at least 90 mol %, at least 95 mol %, at least 99 mol %, or at least 99.9 mol %. The sequestration material can be exposed, in some embodiments, to essentially pure carbon dioxide. In some embodiments, a method involves exposing the sequestration material to an environment that contains carbon dioxide in an amount of at least 1 mol %.

Certain embodiments comprise exposing the sequestration material to an environment (e.g., an atmosphere, a stream) comprising carbon dioxide such that at least a portion of the carbon dioxide interacts with the sequestration material and is sequestered from the environment (e.g., from the atmosphere, from the stream). For example, as shown in FIG. 1, at least a portion of the carbon dioxide in stream 104a interacts with sequestration material 102 and is sequestered from stream 104a, thereby being absent from stream 106a. In certain embodiments, stream 106a may contain less carbon dioxide than stream 104a after at least a portion of the carbon dioxide in stream 104a interacts with sequestration material 102 and is sequestered from stream 104a. The interaction between the carbon dioxide that is sequestered and the sequestration material can take a variety of forms. For example, in certain embodiments, carbon dioxide is absorbed into the sequestration material. In some embodiments, carbon dioxide is adsorbed onto the sequestration material. In some embodiments, carbon dioxide chemically reacts with the sequestration material. In some embodiments, carbon dioxide diffuses into the sequestration material. Combinations of two or more of these mechanisms (i.e., absorption, adsorption, chemical reaction, and/or diffusion) are also possible. In some embodiments, sequestration of the $CO_2$ does not produce a solid precipitant.

According to certain embodiments, a relatively large amount of carbon dioxide is sequestered by the sequestration material (e.g., from an atmosphere, from a stream) during the exposure of the sequestration material to the carbon dioxide. For example, in certain embodiments, at least 1.0 mmol of carbon dioxide is sequestered (e.g., from an environment, e.g., from an atmosphere, from a stream) per gram of the sequestration material. In some embodiments, at least 2.0 mmol, at least 3.0 mmol, at least 4.0 mmol, or at least 5.0 mmol of carbon dioxide is sequestered (e.g., from an environment, e.g., from an atmosphere, from a stream) per gram of the sequestration material. In certain embodiments, at most 10.0 mmol, at most 9.0 mmol, at most 8.0 mmol, at most 7 mmol, or at most 6 mmol of carbon dioxide is sequestered (e.g., from an environment, e.g., from an atmosphere, from a stream) per gram of the sequestration material. Combinations of the above-referenced ranges are also possible (e.g., between or equal to 1.0 mmol per gram and 10.0 mmol per gram, between or equal to 2.0 mmol per gram and 8.0 mmol per gram, between or equal to 4.0 mmol per gram and 7.0 mmol per gram). Other ranges are also possible. In some embodiments, including in some methods described herein, between or equal to 1.0 mmol and 10 mmol of carbon dioxide is sequestered from the environment per gram of the sequestration material.

According to certain embodiments, at least a portion of the carbon dioxide interacts with the sequestration material and is sequestered from an environment containing $CO_2$, such as from an atmosphere or a stream as noted elsewhere herein, over a period of at least 10 seconds, at least 20 seconds, at least 30 seconds, or at least 1 minute. According to certain embodiments, at least a portion of the carbon dioxide interacts with the sequestration material and is sequestered from an environment containing $CO_2$, such as from an atmosphere or a stream as noted elsewhere herein, over a period of 24 hours or less, 12 hours or less, 8 hours or less, 4 hours or less, 1 hour or less, 30 minutes or less, 10 minutes or less, or 2 minutes or less. Combinations of the above-referenced ranges are also possible (e.g., between or equal to 10 seconds and 24 hours, between or equal to 20 seconds and 12 hours, between or equal to 30 seconds and 8 hours, between or equal to 1 minute and 4 hours, between or equal to 1 minute and 10 minutes, between or equal to 1 minute and 2 minutes). Other ranges are also possible.

In certain embodiments, at least 1.0 mmol of the carbon dioxide is sequestered (e.g., from the atmosphere, from the stream) per gram of the sequestration material per 24 hours. In some embodiments, at least 2.0 mmol, at least 3.0 mmol, at least 4.0 mmol, or at least 5.0 mmol of the carbon dioxide is sequestered from the stream per gram of the sequestration material per 24 hours. According to some embodiments, at most 10.0 mmol, at most 9.0 mmol, at most 8.0 mmol, at most 7 mmol, or at most 6 mmol of the carbon dioxide is sequestered from the stream per gram of the sequestration material per 24 hours. Combinations of the above-referenced ranges are also possible (e.g., between or equal to 1.0 mmol per gram and 10.0 mmol per gram, between or equal to 2.0 mmol per gram and 8.0 mmol per gram, between or equal to 4.0 mmol per gram and 7.0 mmol per gram). Other ranges are also possible.

In certain embodiments, the temperature of the sequestration material is less than or equal to 700° C. during at least a portion of the sequestration of carbon dioxide. In certain embodiments, the sequestration material is at a temperature greater than the melting temperature of the salt during at least a portion of the sequestration of carbon dioxide, such that the salt is in molten form. In certain embodiments, the temperature of the sequestration material is at most 700° C., at most 650° C., at most 600° C., at most 550° C., or at most 520° C. during at least a portion of the sequestration of carbon dioxide. In some embodiments, the temperature of the sequestration material is at least 200° C., at least 300° C., at least 400° C., at least 450° C., or at least 500° C. during at least a portion of the sequestration of carbon dioxide. Combinations of the above-referenced ranges are also possible (e.g., between or equal to 200° C. and 700° C., between or equal to 200° C. and 600° C., between or equal to 400° C. and 550° C.). Other ranges are also possible.

In certain embodiments, the temperature of the environment containing carbon dioxide is less than or equal to 700° C. during at least a portion of the sequestration of carbon dioxide. In certain embodiments, the temperature of the environment containing carbon dioxide is at most 700° C., at most 650° C., at most 600° C., at most 550° C., or at most 520° C. during at least a portion of the sequestration of carbon dioxide. In some embodiments, the temperature of the environment containing carbon dioxide is at least 200° C., at least 300° C., at least 400° C., at least 450° C., or at least 500° C. during at least a portion of the sequestration of carbon dioxide. Combinations of the above-referenced ranges are also possible (e.g., between or equal to 200° C. and 700° C., between or equal to 200° C. and 600° C., between or equal to 400° C. and 550° C.). Other ranges are also possible.

In some embodiments, a relatively large weight percentage of the sequestration material sequesters carbon dioxide during sequestration. For example, in some embodiments, at least 1 wt %, at least 10 wt %, or at least 20 wt % of the sequestration material sequesters carbon dioxide during sequestration. In some embodiments, at most 100%, at most 90 wt %, at most 80 wt %, or at most 50 wt % of the sequestration material sequesters carbon dioxide during sequestration. Combinations of the above-referenced ranges are also possible (e.g., between or equal to 1 wt % and 100 wt %, between or equal to 10 wt % and 90 wt %, between or equal to 10 wt % and 80 wt %, between or equal to 20 wt % and 50 wt %). Other ranges are also possible.

In some embodiments, a method further comprises regenerating the sequestration material by removing, from the sequestration material, at least 95 mol % of the carbon dioxide sequestered by the sequestration material. In some embodiments, at least 96 mol %, at least 97 mol %, at least 98 mol %, at least 99 mol %, or at least 99.9 mol % of the carbon dioxide sequestered by the sequestration material is removed from the sequestration material. In some embodiments, the sequestration material remains in a liquid state throughout the sequestration and regeneration process. For example, in some embodiments, the salt remains in a liquid state throughout the sequestration and regeneration process.

In certain embodiments, a method comprises performing at least one sequestration/regeneration cycle (e.g., at least one temperature swing cycle, at least one pressure swing cycle). Each sequestration/regeneration cycle is made up of a sequestration step (in which $CO_2$ is sequestered by the sequestration material) followed by a regeneration step (in which $CO_2$ is released by the sequestration material). According to certain embodiments, the sequestration material can be subject to a relatively large number of sequestration/regeneration cycles while maintaining the ability to sequester and release relatively large amounts of $CO_2$.

The sequestration material can be exposed to any of the environments (e.g., atmospheres, streams) described above or elsewhere herein during one or more (or all) of the sequestration steps of the one or more sequestration/regeneration cycles. One or more (or all) of the regeneration steps of the sequestration/regeneration cycles can be performed using a variety of suitable second environments (e.g., fluids, atmospheres, streams). In some embodiments, regeneration of the sequestration material can be performed by flowing an inert gas (e.g., argon, $N_2$) over the sequestration material. Non-limiting examples of suitable environment components that can be used during the regeneration step include a flow of 100 mol % $N_2$, or a flow of air.

In some embodiments, the gas space in a desorber vessel (further described elsewhere herein) comprises carbon dioxide, e.g., greater than or equal to 50 volume % of the gas space in the desorber vessel is made of carbon dioxide. As would be understood by a person of ordinary skill in the art, the volume % of gas space made of carbon dioxide can be determined by dividing the partial pressure of carbon dioxide in the gas space by the total pressure of gas in the gas space and multiplying by 100%. As used herein, the term "gas space" refers to a space or a volume occupied by gas in a vessel (e.g., an adsorber vessel, a desorber vessel). In some embodiments, the gas space in a desorber vessel is at the same pressure as the gas space in an adsorber vessel (further described elsewhere herein). In other embodiments, the gas space in a desorber vessel at a different (e.g., lower) pressure than the gas space in an adsorber vessel.

In some embodiments, the gas space in a vessel, in a system configured for batch operation (further described elsewhere herein), during a regeneration step comprises carbon dioxide, e.g., greater than or equal to 50 volume % of the gas space in the vessel is made of carbon dioxide. In some embodiments, the gas space in a vessel, in a system configured for batch operation, during a regeneration step is at the same pressure as the gas space in the vessel during a sequestration step. In other embodiments, the gas space in a vessel, in a system configured for batch operation, during a regeneration step is at a different (e.g., lower) pressure than the gas space in the vessel during a sequestration step.

According to certain embodiments, a method comprises cycling the sequestration material at least 2 (or at least 5, at least 10, at least 50, at least 100, at least 1000, or at least 10,000) times. In some such embodiments, during each of the 2 (or during each of the 5, each of the 10, each of the 50, each of the 100, each of the 1000, and/or each of the 10,000) sequestration steps of the cycles, the amount of $CO_2$ that is sequestered by the sequestration material is at least 75%, at least 90%, at least 95%, at least 98%, at least 99%, or at least 99.9% of the amount of $CO_2$ that is sequestered by the sequestration material during an equivalent sequestration step of the $1^{st}$ cycle. In some such embodiments, during each of the 2 (or during each of the 5, each of the 10, each of the 50, each of the 100, each of the 1000, and/or each of the 10,000) regeneration steps of the cycles, the amount of $CO_2$ that is released by the sequestration material is at least 75%, at least 90%, at least 95%, at least 98%, at least 99%, or at least 99.9% of the amount of $CO_2$ that is released by the sequestration material during an equivalent regeneration step of the $1^{st}$ cycle. In some such embodiments, the amount of $CO_2$ that is released by the sequestration material during the regeneration step of the $1^{st}$ cycle is at least 75%, at least 90%, at least 95%, at least 98%, at least 99%, or at least 99.9% of the amount of $CO_2$ that is sequestered by the sequestration material during the sequestration step of the $1^{st}$ cycle. In some such embodiments, the amount of $CO_2$ that is sequestered during the sequestration step of the $1^{st}$ cycle, the $10^{th}$ cycle, and/or the $100^{th}$ cycle is at least 1.0 mmol, at least 2.0 mmol, at least 3.0 mmol, at least 4.0 mmol, or at least 5.0 mmol (and/or at most 10.0 mmol, at most 9.0 mmol, at most 8.0 mmol, at most 7 mmol, or at most 6 mmol) per gram of the sequestration material. In certain embodiments, the temperature of the sequestration material during the sequestration/regeneration cycles is at most 700° C., at most 650° C., at most 600° C., at most 550° C., or at most 520° C. (and/or at least 200° C., at least 300° C., at least 400° C., at least 450° C., or at least 500° C.). In certain embodiments, the time over which each of the sequestration steps and each of the regeneration steps occurs is 24 hours or less (or 12 hours or less, 8 hours or less, 4 hours or less, 1 hour or less, 30 minutes or less, 10 minutes or less, or 2 minutes or less, and/or at least 10 seconds, at least 20 seconds, at least 30 seconds, or at least 1 minute). In some embodiments, the steady state concentration of carbon dioxide in the environment to which the sequestration material is exposed during the sequestration steps of the sequestration/regeneration cycles is as little as 50 mol %, as little as 25 mol %, as little as 10 mol %, or as little as 1 mol % carbon dioxide (e.g., with the balance of the environment being argon).

In some embodiments, systems for sequestering carbon dioxide using a sequestration material comprising a salt in molten form are provided. Systems described herein may be used to carry out methods described herein using sequestration materials described herein.

In some embodiments, a system configured for sequestering carbon dioxide in a batch operation is provided. A system configured for batch operation may comprise any of a number of suitable components. In some embodiments, a system configured for batch operation comprises an inlet to a vessel, the vessel, and an outlet to the vessel. In some embodiments during a sequestration step, the inlet is configured to receive a carbon dioxide-rich fluid, which fluid can flow from the inlet to the vessel. In certain embodiments, the vessel is configured to contain a sequestration material described herein. In some embodiments during a regeneration step, the outlet is configured to receive a carbon dioxide-lean fluid from the vessel, having a lower mole percentage of carbon dioxide than the carbon dioxide-rich fluid, at least because some sequestration by the sequestration material occurred in the vessel. In some embodiments during a regeneration step, the inlet is configured to receive energy or work (e.g., from a heated and/or pressured gas), which can flow from the inlet to the vessel. In some embodiments during a regeneration step, the outlet is configured to receive pure carbon dioxide from the vessel, due to regeneration of the sequestration material in the vessel.

In some embodiments, a system configured for sequestering carbon dioxide in a continuous operation is provided. A system configured for continuous operation may comprise any of a number of suitable components. In some embodiments, a system configured for continuous operation comprises an inlet to an adsorber vessel, the adsorber vessel, and an outlet to the adsorber vessel. In some embodiments, a system configured for continuous operation further comprises an inlet to a desorber vessel, the desorber vessel, and an outlet to the desorber vessel. In some embodiments, a system for continuous operation further comprises a first conduit between the adsorber vessel and the desorber vessel configured to transport carbon dioxide-loaded sequestration material from the adsorber vessel to the desorber vessel. In some embodiments, a system further comprises a first pump configured in line with the first conduit to transport the carbon dioxide-loaded sequestration material. In certain embodiments, the first pump is a slurry pump. In some embodiments, a system for continuous operation further comprises a second conduit between the adsorber vessel and the desorber vessel configured to transport unloaded sequestration material from the desorber vessel to the adsorber vessel. In some embodiments, a system further comprises a second pump configured in line with the second conduit to transport the unloaded sequestration material. In some embodiments, a system further comprises a heat exchanger in line with the first conduit and/or second conduit (e.g., configured for a temperature swing operation). In some embodiments, a system further comprises a re-boiler or heater fluidically connected with the desorber vessel and the pump (e.g., configured for temperature swing operation). In some embodiments, a system further comprises a compressor fluidically connected with the desorber vessel configured to output a pure carbon dioxide stream. Systems provided herein may comprise any suitable combination of components.

Systems that are a hybrid of a system configured for batch operation and a system configured for continuous operation are also contemplated.

As used herein, "carbon dioxide-loaded" sequestration material refers to sequestration material at least a portion of which (e.g., between or equal to 1 wt % and 90 wt %) has sequestered carbon dioxide.

As used herein, "unloaded" sequestration material refers to sequestration material at least a portion of which (e.g., between or equal to 75 wt % and 100 wt %, between or equal to 85 wt % and 100 wt %, between or equal to 95 wt % and 100 wt %) has had carbon dioxide removed.

In some embodiments, a system (e.g., a system for batch operation, a system for continuous operation) provided herein includes at least one temperature controller configured to control the temperature of a vessel (e.g., an adsorber vessel, a desorber vessel). For example, a temperature controller may be used to set the temperature of the vessel at or above the melting temperature of the salt of the sequestration material, in order to maintain at least some of the salt in molten form during sequestration.

Systems (e.g., a system for batch operation, a system for continuous operation) described herein can be used for a pressure swing carbon dioxide separation operation at a high temperature (e.g., between or equal to 200° C. and 700° C., between or equal to 500° C. and 550° C.) using a sequestration material described herein. For example, in some embodiments, during a sequestration step (e.g., in an adsorber vessel), the partial pressure of carbon dioxide in a first environment to which the sequestration material is exposed is between or equal to 0.01 bar and 20 bar (e.g., between or equal to 0.1 bar and 10 bar), and the total pressure of the first environment to which the sequestration material is exposed is between or equal to 1 bar and 30 bar, or between or equal to 1 bar and 50 bar. In some embodiments, the total pressure of the first environment to which the sequestration material is exposed may be at least 1 bar, at least 2 bar, at least 5 bar, at least 10 bar, at least 20 bar, at least 50 bar, at least 100 bar, or more. In certain embodiments, during a sequestration step, the carbon dioxide is between or equal to 10 mol % and 30 mol % of the first environment (e.g., a stream). In some embodiments, during a regeneration step (e.g., in a desorber vessel), the partial pressure of carbon dioxide in a second environment to which the sequestration material is exposed is between or equal to 0 bar and 0.01 bar, and the total pressure of the second environment to which the sequestration material is exposed is between or equal to 1 bar and 20 bar. In some embodiments, the total pressure of the second environment to which the sequestration material is exposed may be less than 20 bar, less than 10 bar, less than 5 bar, less than 2 bar, less than 1.5 bar, less than 1.2 bar, less than 1.1 bar, less than 1 bar, (e.g., under vacuum), less than 0.5 bar, less than 0.1 bar, or less than 0.01 bar. In some embodiments, the difference between the total pressure of the first environment and the total pressure of the second environment is between or equal to 0 bar and 20 bar. In certain embodiments, the difference between the total pressure of the first environment and the total pressure of the second environment is at least 0.1 bar, at least 1 bar, at least 5 bar, at least 10 bar, at least 50 bar, at least 100 bar, or more. In some embodiments, the difference between the partial pressure of carbon dioxide in the first environment and the partial pressure of carbon dioxide in the second environment is between or equal to 1 bar and 20 bar. Other ranges are also possible. For example, in a pressure swing operation, a sequestration material may be exposed to a first environment at pressure 30 bar with a partial pressure of carbon dioxide of 1 bar during a sequestration step, and the sequestration material may be exposed to a second environment at a pressure of 20 bar with a partial pressure of carbon dioxide of 0 bar during a regeneration step.

Systems (e.g., a system for batch operation, a system for continuous operation) described herein can be used for a temperature swing carbon dioxide separation operation at a high base temperature (e.g., between or equal to 200° C. and 600° C.). For example, in some embodiments, during a sequestration step (e.g., in an adsorber vessel), a first temperature of a sequestration material is held at between or equal to 200° C. and 600° C. In some embodiments, during a regeneration step (e.g., in a desorber vessel), a second temperature of a sequestration material is held at between or equal to 250° C. and 700° C. In some embodiments, the difference between the second temperature and the first temperature is between or equal to 10° C. and 100° C. (e.g., between or equal to 20° C. and 70° C., 50° C.). For example, in a temperature swing operation, a sequestration material may be held at 500° C. during a sequestration step and 550° C. during a regeneration step.

U.S. Provisional Application No. 62/742,078, filed Oct. 5, 2018, and entitled "Carbon Dioxide Removal Using Sequestration Materials that Include Salts in Molten Form, and Related Systems and Methods," and U.S. Provisional Application No. 62/815,656, filed Mar. 8, 2019, and entitled "Carbon Dioxide Removal Using Sequestration Materials that Include Salts in Molten Form, and Related Systems and Methods," are both incorporated herein by reference in their entireties for all purposes.

The following examples are intended to illustrate certain embodiments of the present invention, but do not exemplify the full scope of the invention.

Example 1

The following example describes the preparation of a non-limiting sequestration material. Lithium hydroxide (LiOH, 98%), sodium hydroxide (NaOH, 97%), potassium hydroxide (KOH, 99.9%), and boric acid ($H_3BO_3$, 99.5%) were purchased from Sigma-Aldrich. All chemicals were used as received without further purification. All water utilized in the experiments was Mill-Q (Millipore) deionized water. A series of alkali metal borate compounds were prepared by the calcination of the mixed precipitants of alkali metal hydroxide and boric acid. In a typical procedure for the preparation of $Na_xB_{1-x}O_y$ (x=0.75), note that electroneutrality dictates that y=1.5−x, 0.075 mol of sodium hydroxide and 0.025 mol of boric acid were dissolved in 30 ml of distilled water under vigorous stirring. The aqueous solution was dried at 120° C. for several hours to precipitate out the mixed hydroxides. The dried precipitant was ground with an agate mortar and calcined in the oven at 400° C. in air for 4 h. The obtained composite was reground into powders and calcined at 650° C. in a flow of 100% $N_2$ for 1 h to obtain the final product.

Example 2

The following example describes the characterization and analysis of a non-limiting sequestration material. $CO_2$ uptake performance by the sequestration material synthesized in Example 1 under isothermal conditions was examined under a flow of 100% dry $CO_2$ (Airgas) at atmospheric pressure measured using a thermogravimetric analyzer (TGA, TGA Q50; TA Instrument). The sequestration material, after the pre-calcination at 400° C. followed by regrinding, was placed on a Pt sample pan in the TGA chamber, and underwent calcination at a final temperature of 650° C. under a flow of 100% $N_2$. After the calcination at 650° C., the temperature in the sample chamber was turned into the setting temperature for the uptake analysis. The measurements of $CO_2$ uptake were initiated by switching the flow gas introduced into the sample chamber from 100% $N_2$ to 100% dry $CO_2$. The uptake of $CO_2$ was calculated by dividing the increments of sample weight per 1 g of the sample before the introduction of $CO_2$ gas in the sample chamber by the molecular weight of $CO_2$ (MW=44.0 g/mol). The desorption performance was measured by the decrease of weight under a flow of 100% $N_2$ at different temperatures after the uptake of $CO_2$ at 600° C. under a flow of 100% $CO_2$ for 10 min. The $CO_2$ uptake with increasing temperature was examined at the temperature ramping rate of 5° C./min from 200° C. to 800° C. under the same sample and gas flow conditions as the isothermal $CO_2$ uptake analysis described above. Cyclic regenerability of $CO_2$ uptake of desorption by the sequestration material by temperature-swing was examined by switching the temperature in the sample chamber and the gas introduced in it by TGA between 100% $CO_2$ and 100% $N_2$ repeatedly. Pre-treatment of the samples were performed under the same procedure as the isothermal $CO_2$ uptake analysis described above. Cyclic regenerability analysis by pressure-swing was performed by switching the gas introduced into sample chamber between 100% $CO_2$ and 100% $N_2$ at a constant temperature (700° C.). Pre-treatment of the sequestration material was performed under the same procedure as the isothermal $CO_2$ uptake analysis described above. The melting point of the sequestration material was identified by endothermic peaks in the heat flow with increasing temperature under a flow of 100% $N_2$ measured by using differential scanning calorimetry (DSC, SDT-Q600; TA Instrument). Fluidity of the molten sequestration material at high temperatures was examined by the viscosity measurement using a rheometer equipped with Environmental Testing Chamber (AR 2000-ETC; TA Instrument). The variation of viscosities as a function of shear rate was measured at a constant temperature (600° C.).

Example 3

Figure 3A:
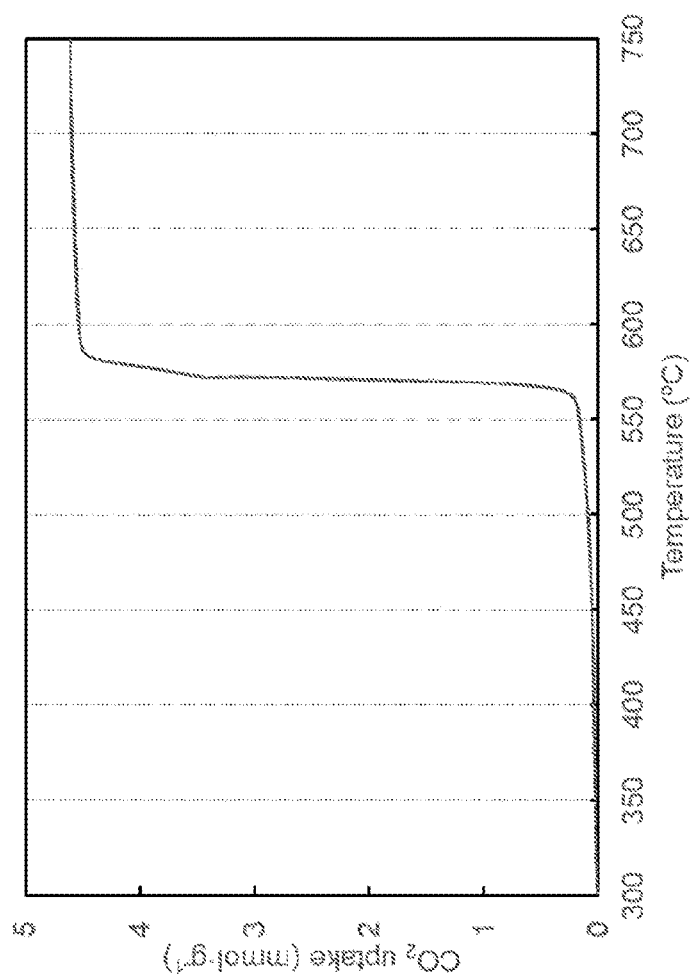
FIG. 3A is a plot showing the sequestration of $CO_2$ by a sequestration material as a function of temperature, according to certain embodiments.
Figure 3B:
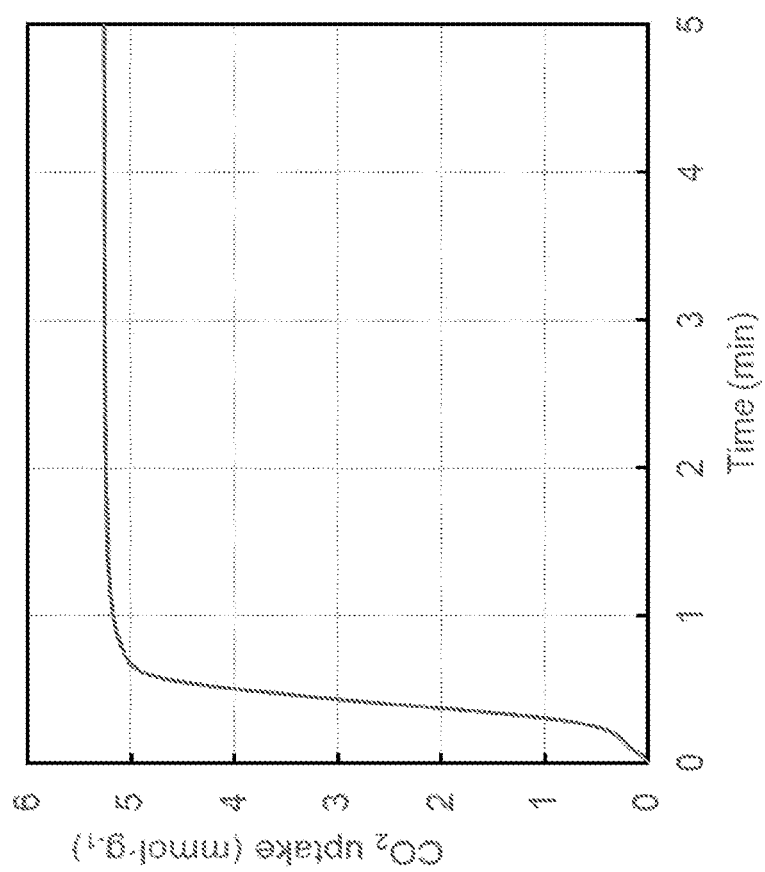
FIG. 3B is a plot showing the sequestration of $CO_2$ by a sequestration material as a function of time, according to certain embodiments.
Figure 3C:
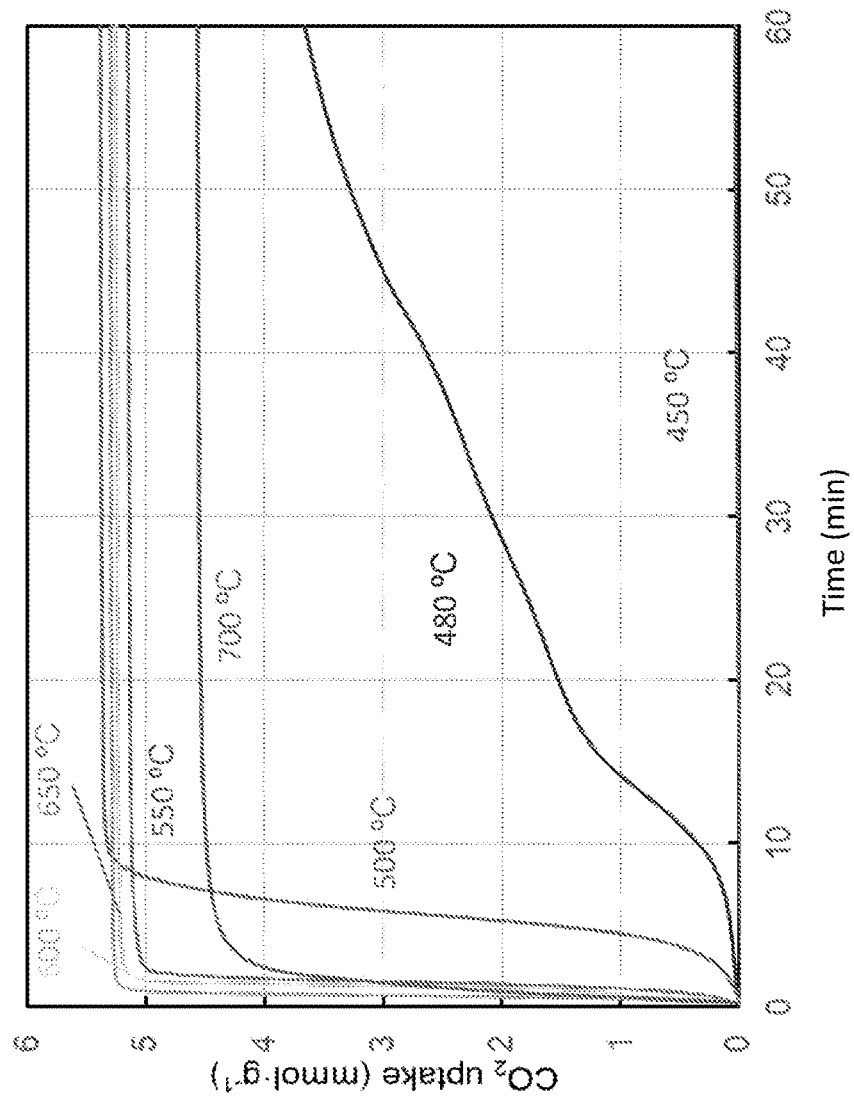
FIG. 3C is a plot showing the sequestration of $CO_2$ at different temperatures by a sequestration material as a function of time, according to certain embodiments.
Figure 3D:
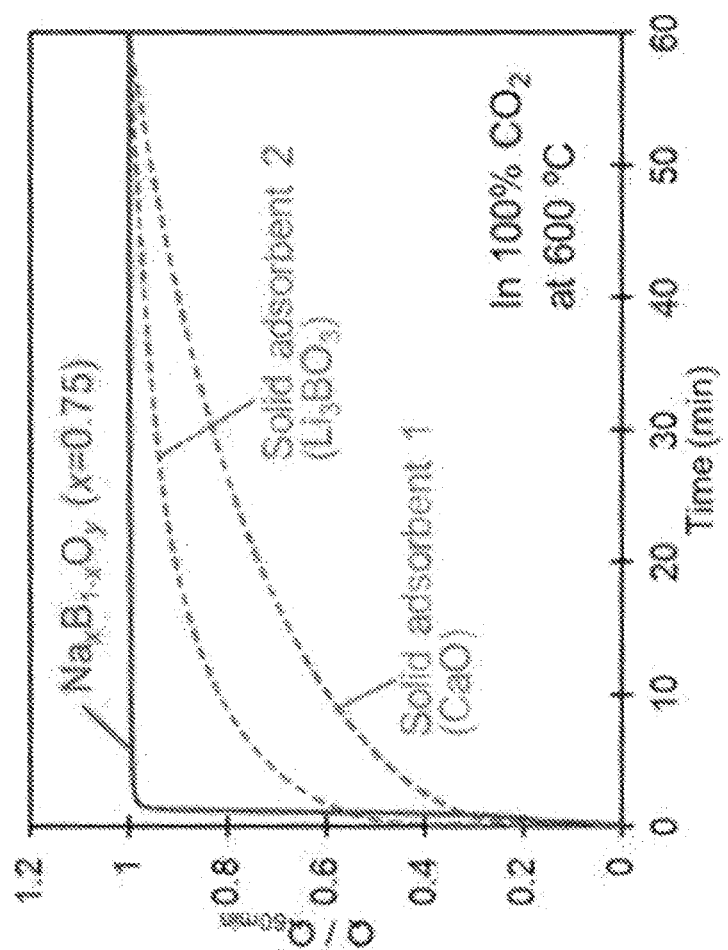
FIG. 3D is a plot showing the sequestration of $CO_2$ by a sequestration material as a function of time compared to $CO_2$ adsorbents, according to certain embodiments.
Figure 3E:
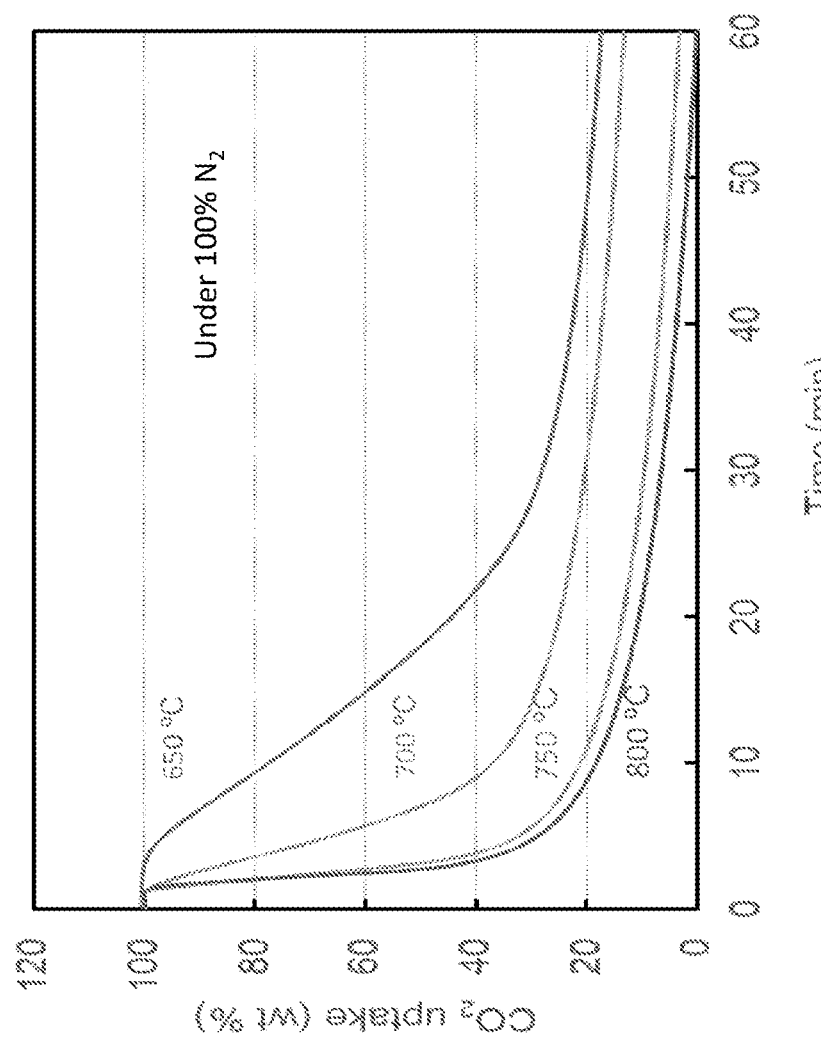
FIG. 3E is a plot showing the desorption of $CO_2$ by a sequestration material as a function of time, according to certain embodiments.

The following example describes $CO_2$ uptake and desorption by a sequestration material. The performance of $CO_2$ uptake by the sequestration material was examined first with a mixing ratio of moles of sodium (to the total of moles of sodium plus moles of boron) of 0.75, $Na_xB_{1-x}O_y$ (x=0.75). FIG. 3A shows the uptake of $CO_2$ (Q [mmol·$g^{-1}$]) by a sequestration material as the temperature increases at the rate of 5° C./min under a flow of 100% $CO_2$ at atmospheric pressure (1 bar). The uptake of $CO_2$ by the sequestration material at this composition was enhanced drastically when the temperature was elevated up to the onset temperature ($T_{on}$) at around 570° C. After the rapid jump at $T_{on}$, the uptake reached nearly full capacity (~4.6 mmol·$g^{-1}$) rapidly in a few minutes to be leveled off at higher temperatures. FIG. 3B shows the isothermal $CO_2$ uptake of a sequestration material at 600° C., and FIG. 3C shows the isothermal $CO_2$ uptake by the same sequestration material at different temperatures under a flow of 100% $CO_2$. The results revealed that the uptake proceeded at an extremely fast rate for temperatures equal to or higher than 550° C. The most rapid uptake was recorded at 650° C., where 99% of the full uptake capacity (~5.26 mmol·$g^{-1}$) was completed in 1 min of the reaction with $CO_2$. At 500° C., a few minutes of initial induction period appeared before the rapid uptake was initiated. At 450° C., there was no substantial amount of uptake. The uptake of the sequestration material at 600° C. was compared with the uptake by CaO and $Li_3BO_3$ in the same condition, as shown in FIG. 3D. The uptake was normalized by the uptake capacities attained by 1 h reaction with $CO_2$. The results indicate that the uptake by the sequestration material increases differently from that of these solid adsorbents. For the case of CaO and $Li_3BO_3$, the uptake rate decelerated as the reaction proceeded, resulting in a gradual approach to the full uptake capacity with increasing reaction time. In contrast, the uptake by the sequestration material jumped up nearly to full capacity without the deceleration of uptake rate. FIG. 3E shows the $CO_2$ desorption curves at different temperatures in a flow of 100% $N_2$ for the sequestration material ($Na_xB_{1-x}O_y$, (x=0.75)) after the uptake of $CO_2$ under a flow of 100% $CO_2$ at 600° C. for 10 min. The results indicate that the desorption of $CO_2$ occurred more rapidly at temperatures higher than 650° C. under a flow of 100% $N_2$. $CO_2$ was desorbed more rapidly after an initial slow stage, and then the rate decreased as the desorption proceeded. As the temperature for regeneration was elevated higher, the rate of desorption became faster. At 800° C., desorption of 80% of pre-absorbed $CO_2$ was completed in 10 min after the $N_2$ gas was introduced into the test chamber.

Figures 4C, 4D:
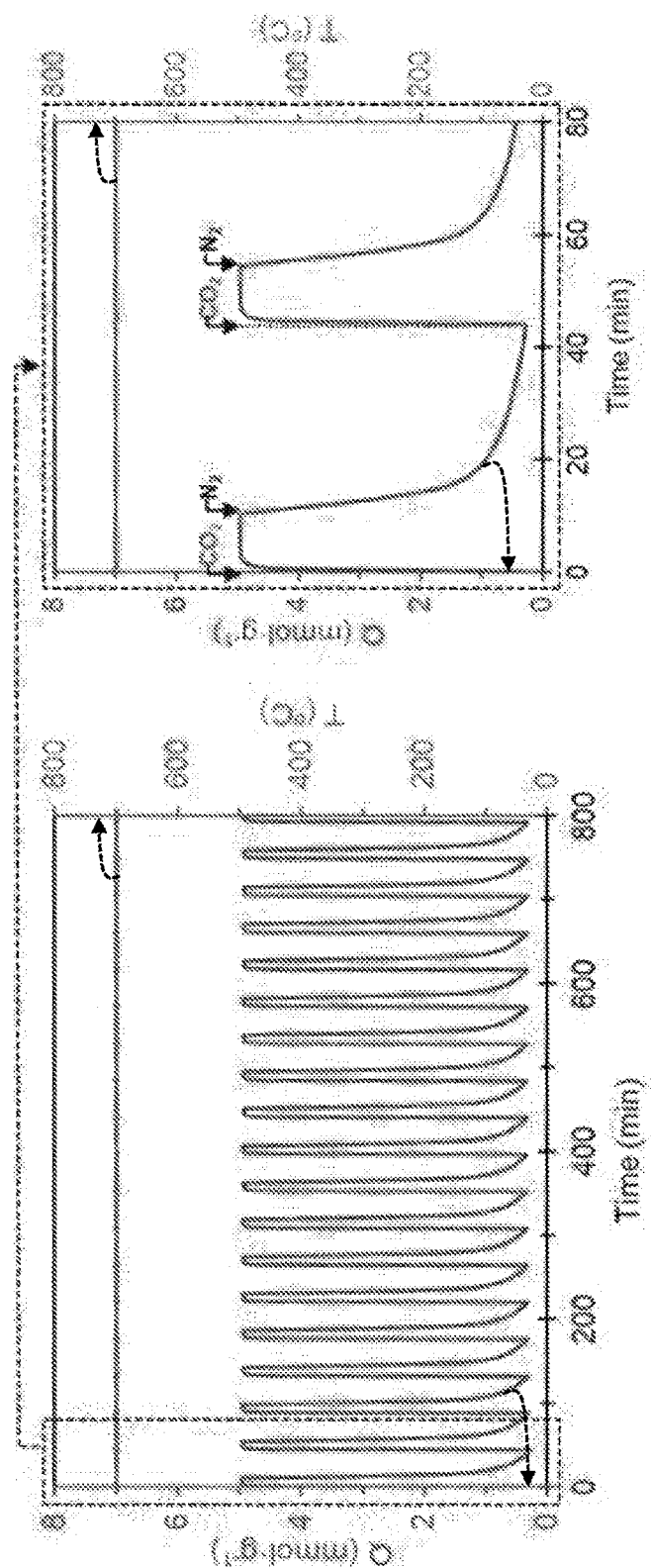
FIG. 4C is a plot showing the cyclic regenerability of a sequestration material by a pressure-swing method, according to certain embodiments.
FIG. 4D is a plot of the first eighty minutes of FIG. 4C, according to certain embodiments.
Figures 4E, 4F:
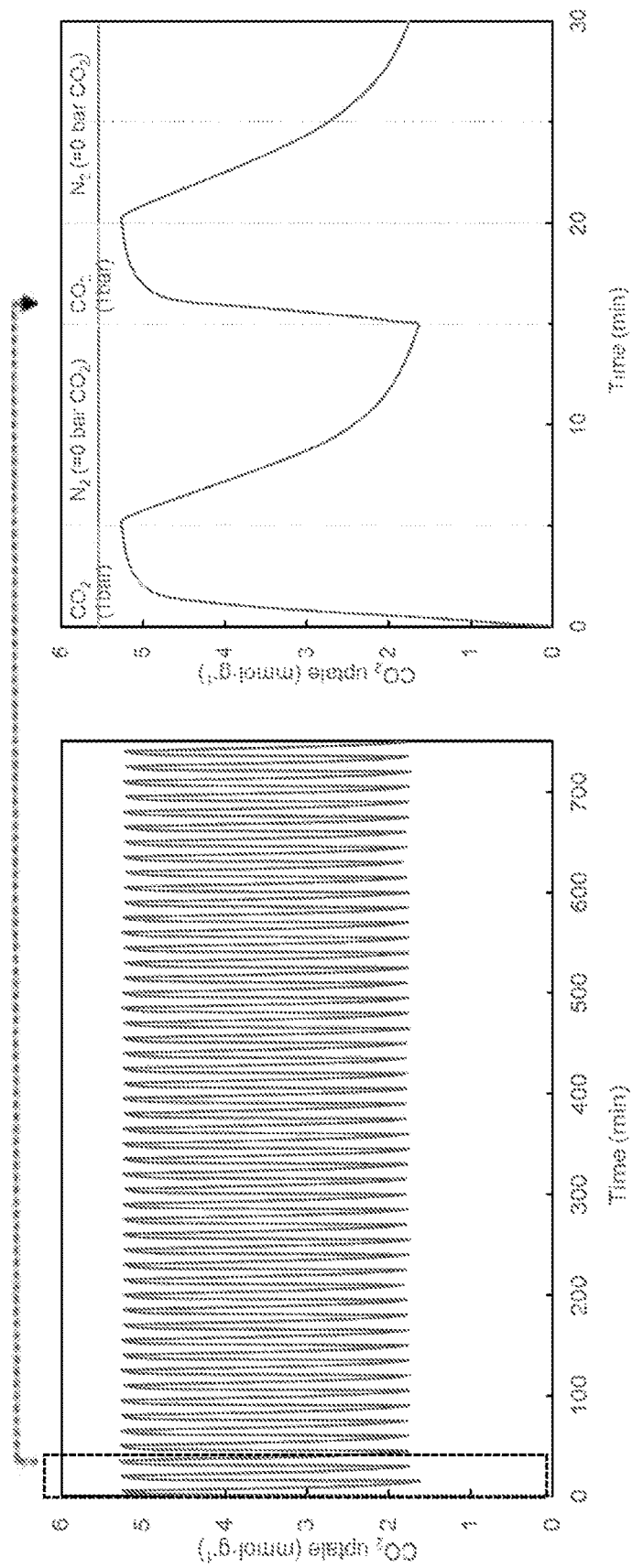
FIG. 4E is a plot showing the cyclic regenerability of an additional sequestration material by a pressure-swing method, according to certain embodiments.
FIG. 4F is a plot of the first thirty minutes of FIG. 4E, according to certain embodiments.
Figure 10B:
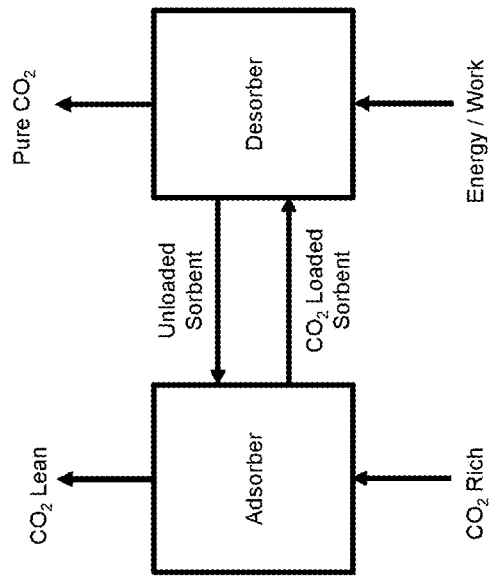
FIG. 10B is a schematic diagram of a continuous swing operation system, according to certain embodiments.
Figure 10A:
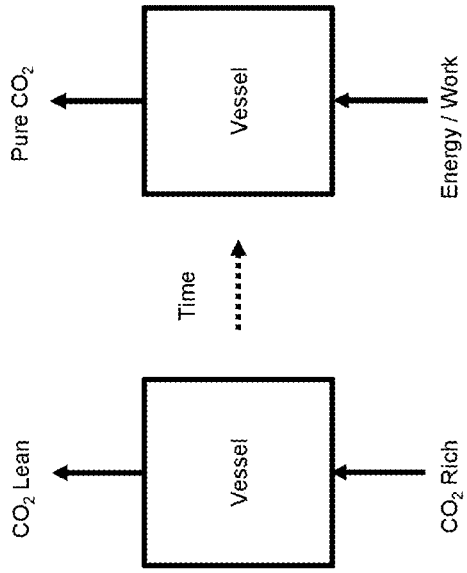
FIG. 10A is schematic diagram of a batch swing operation system, according to certain embodiments.
Figure 10C:
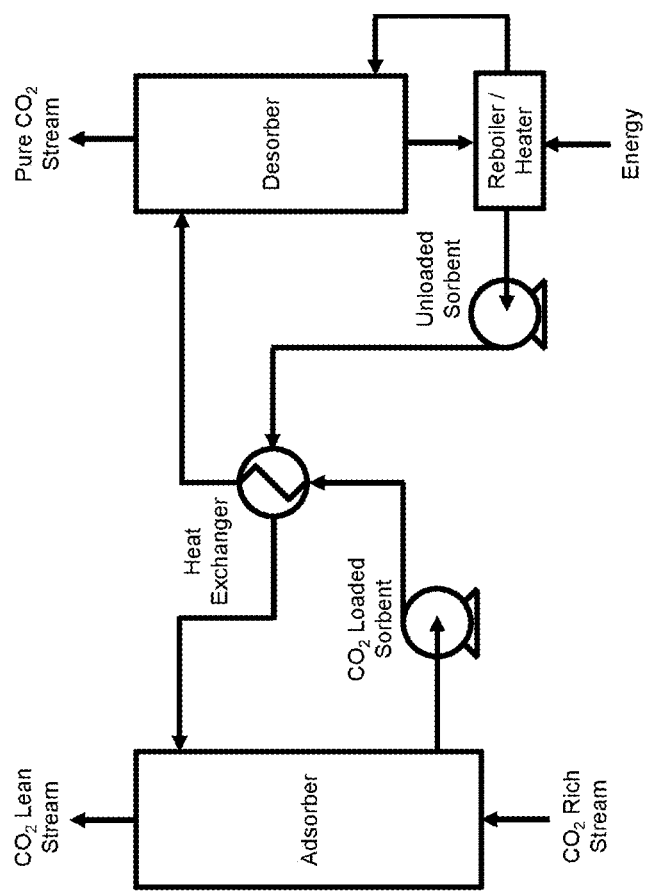
FIG. 10C is a schematic diagram of a continuous temperature swing operation system, according to certain embodiments.
Figure 10D:
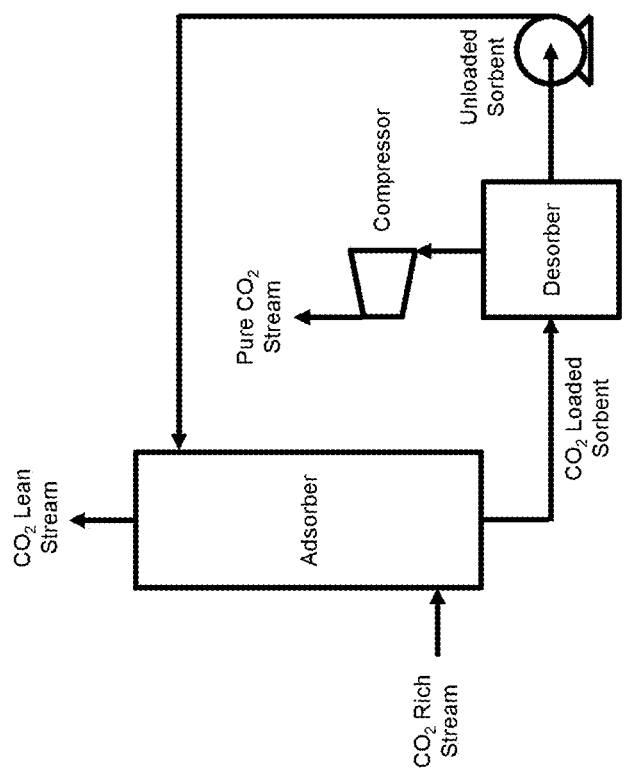
FIG. 10D is a schematic diagram of a continuous pressure swing operation system, according to certain embodiments.

The cyclic regenerability of $CO_2$ uptake and the extent of desorption is an important characteristic of adsorbents operating in a practical $CO_2$ capture system. The cyclic performance of sequestration material $Na_xB_{1-x}O_y$ (x=0.75) by the temperature-swing method is summarized in FIGS. 4A and 4B. The temperature-swing operation was performed by the swing of temperature between 600° C. for uptake in a flow of 100% $CO_2$ and 750° C. for desorption in a flow of 100% $N_2$, a difference of 150° C. The cyclic performance of sequestration material $Na_xB_{1-x}O_y$ (x=0.75) by the pressure-swing method is summarized in FIGS. 4C and 4D. For the pressure swing operation, the temperature was kept at 700° C. during the entire period of operation, and the direction of the reaction was switched by the alternation of gas stream introduced in the sample chamber from 100% $CO_2$ ($p_{CO2}$=1 bar) to 100% $N_2$ ($p_{CO2}$=0 bar). The results revealed that the sequestration material had cyclic regenerability with no significant decrease of uptake capacity nor significant decrease of reaction rate by the cyclic operation. The duration of desorption in each cycle was fixed at 10 min to reduce the operating time. Accordingly, the uptake was not returned to the initial value by either temperature- or pressure-swing desorption. However, the uptake and desorption performance in the higher cycles were virtually identical to the initial cycle. The cyclic regenerability of an additional sequestration material ($Na_3BO_3$) by an isothermal pressure swing operation at 700° C. is also shown in FIG. 4E and FIG. 4F. Various swing operation systems are shown in FIG. 10A, FIG. 10B, FIG. 10C, and FIG. 10D. More specifically, FIG. 10A is schematic diagram of a batch swing operation system, according to certain embodiments; FIG. 10B is a schematic diagram of a continuous swing operation system, according to certain embodiments; FIG. 10C is a schematic diagram of a continuous temperature swing operation system, according to certain embodiments; and FIG. 10D is a schematic diagram of a continuous pressure swing operation system, according to certain embodiments.

Figure 5A:
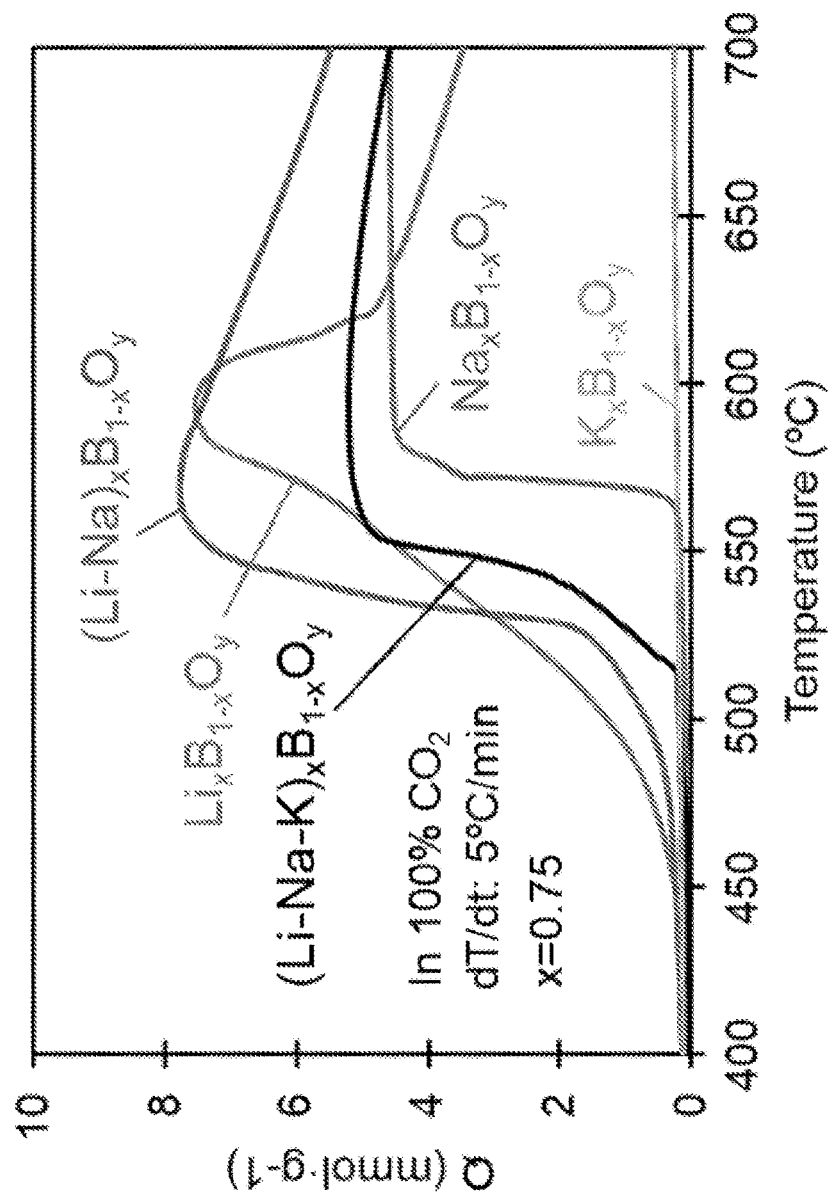
FIG. 5A is a plot showing the sequestration of $CO_2$ by various sequestration materials with different alkali metals as a function of temperature, according to certain embodiments.
Figure 5B:
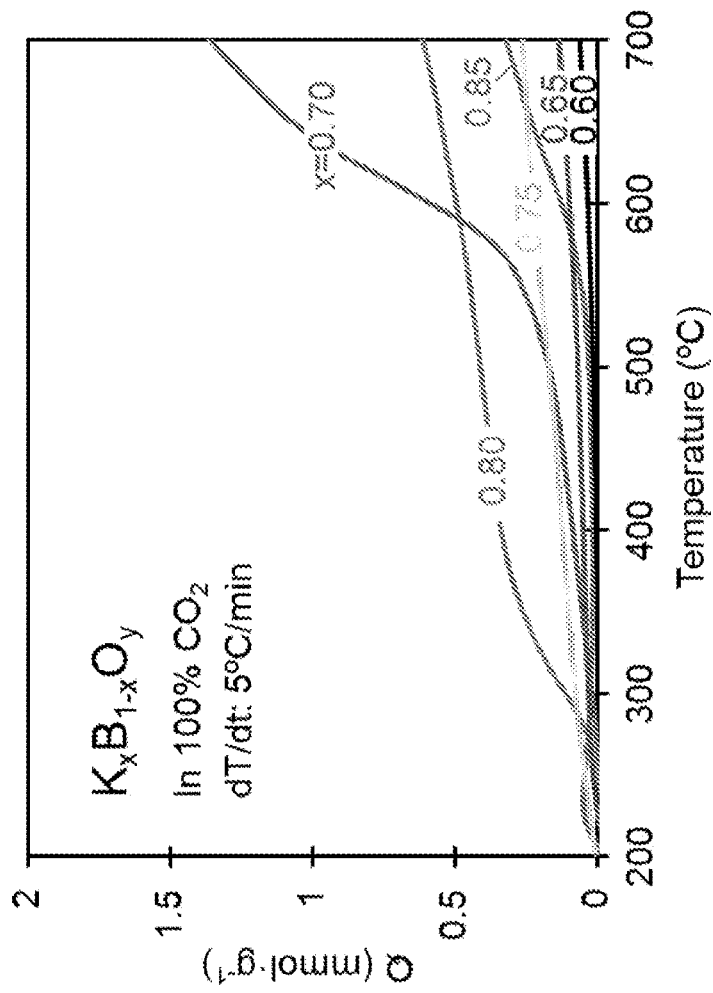
FIG. 5B is a plot of the sequestration of $CO_2$ by various sequestration materials of the form $K_xB_{1-x}O_y$ with various mixing ratios (x) as a function of temperature, according to certain embodiments.
Figure 5C:
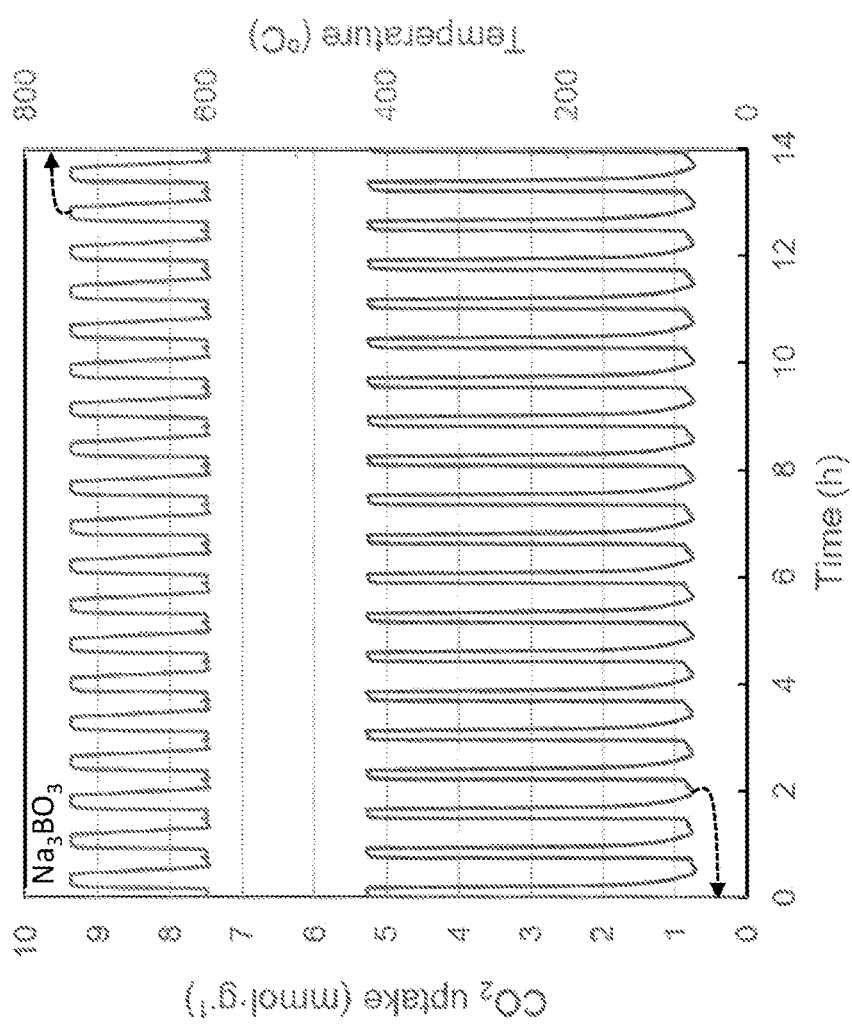
FIG. 5C is a plot showing the cyclic regenerability of $Na_3BO_3$, according to certain embodiments.
Figure 5D:
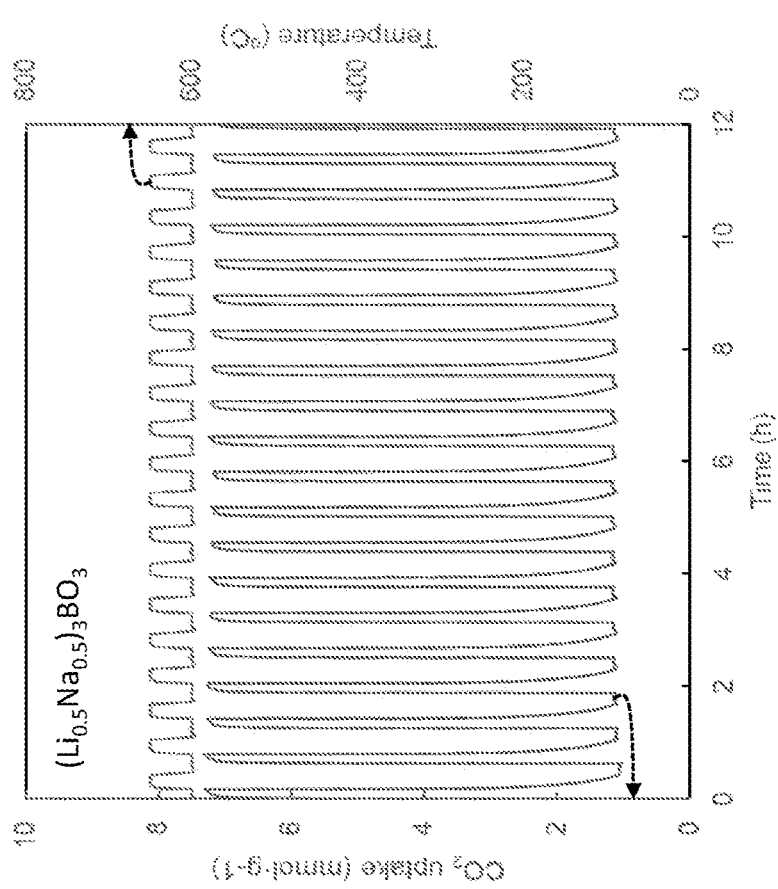
FIG. 5D is a plot showing the cyclic regenerability of $(Li-Na)_xB_{1-x}O_y$ (x=0.75, y=1.5-x), according to certain embodiments.
Figure 5E:
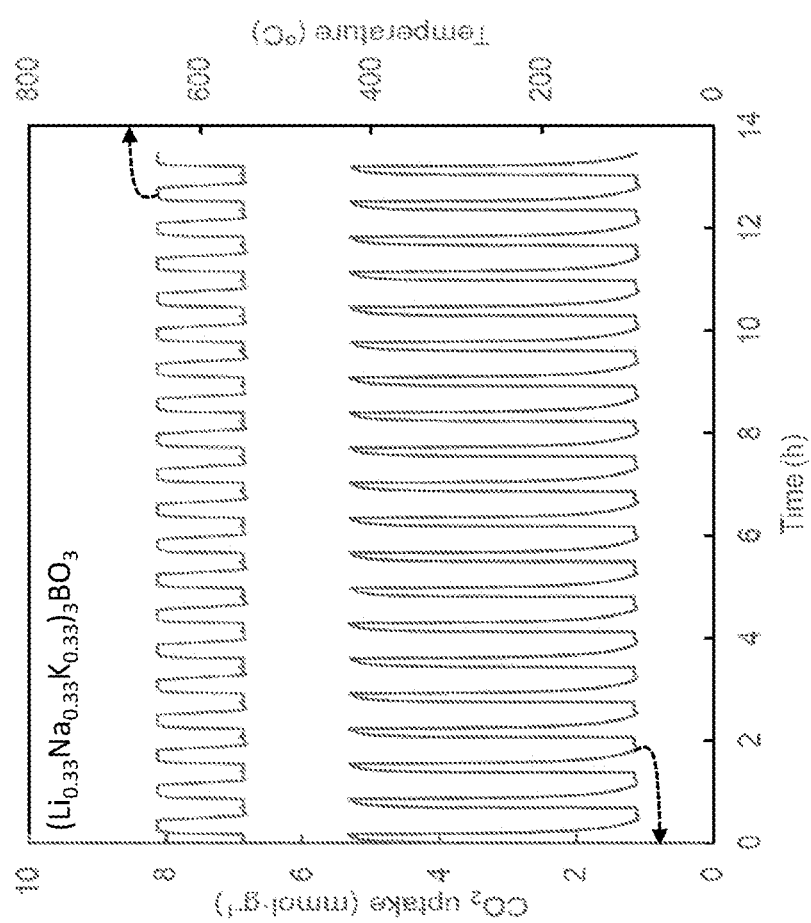
FIG. 5E is a plot showing the cyclic regenerability of $(Li-Na-K)_xB_{1-x}O_y$ (x=0.75, y=1.5-x), according to certain embodiments.

Next, the effect of alkali metal species present in the sequestration material on the $CO_2$ uptake performance was examined. FIG. 5A shows the uptake of $CO_2$ by sequestration materials with different alkali metal species as the temperature increases at the rate of 5° C./min under a flow of 100% $CO_2$. The mixing ratio of moles of alkali metal (A) (to the total of moles of A plus moles of boron (B)) in the alkali metal borates (x) was kept at x=0.75 for the series of samples. Binary (in this example, A=(Li—Na)), and ternary (in this example, A=(Li—Na—K)) mixtures of the alkali metals samples were prepared with an equimolar mixture of the alkali metal species. The results indicate that the onset temperature where the rapid uptake is initiated shifted to lower temperatures when sodium was substituted with lithium (i.e., $Li_xB_{1-x}O_y$) or the example mixed species including lithium ((Li—Na)$_x$B$_{1-x}$O$_y$, (Li—Na—K)$_x$B$_{1-x}$O$_y$). For the case of $Li_xB_{1-x}O_y$, the uptake accelerated as the temperature increased and then decelerated to reach a maximum at around 590° C., which was followed by a decline of uptake at higher temperatures. For mixed alkali metal species, the uptake accelerated as the temperature increased and then decelerated to reach a maximum at around 570° C., which was followed by a less steep decline of uptake at higher temperatures. For potassium borate ($K_xB_{1-x}O_y$), the uptake was low over the temperature range with no initiation of uptake enhancement, though it showed a moderate uptake acceleration for the potassium borate with x=0.70, as shown in FIG. 5B. Cyclic regenerability in the repeated cycles of $CO_2$ uptake and desorption was also examined for the compounds with mixed alkali metal species, as shown in FIG. 5D and FIG. 5E, as compared to $Na_3BO_3$ in FIG. 5C. Both of (Li—Na)$_x$B$_{1-x}$O$_y$ and (Li—Na—K)$_x$B$_{1-x}$O$_y$ showed cyclic regenerability with no significant decrease in the uptake capacity. The uptake rates were comparably as fast as that for sodium borate, and the full uptake capacity, 7.27 mmol·g$^{-1}$ for (Li—Na)$_x$B$_{1-x}$O$_y$ and 5.33 mmol·g$^{-1}$ for (Li—Na—K)$_x$B$_{1-x}$O$_y$, was attained in a few minutes under reaction with $CO_2$.

Figure 6A:
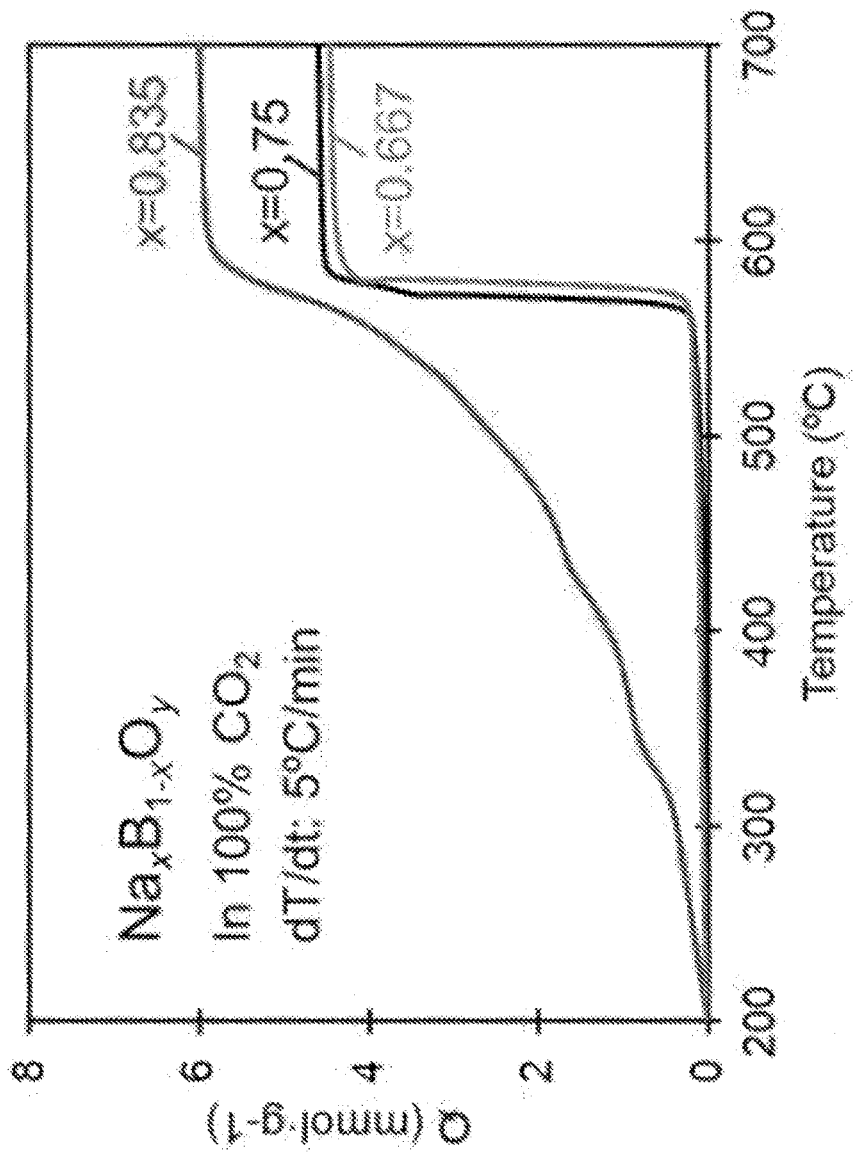
FIG. 6A is a plot of the sequestration of $CO_2$ by various sequestration materials of the form $Na_xB_{1-x}O_y$ with various mixing ratios (x) as a function of temperature, according to certain embodiments.
Figure 6B:
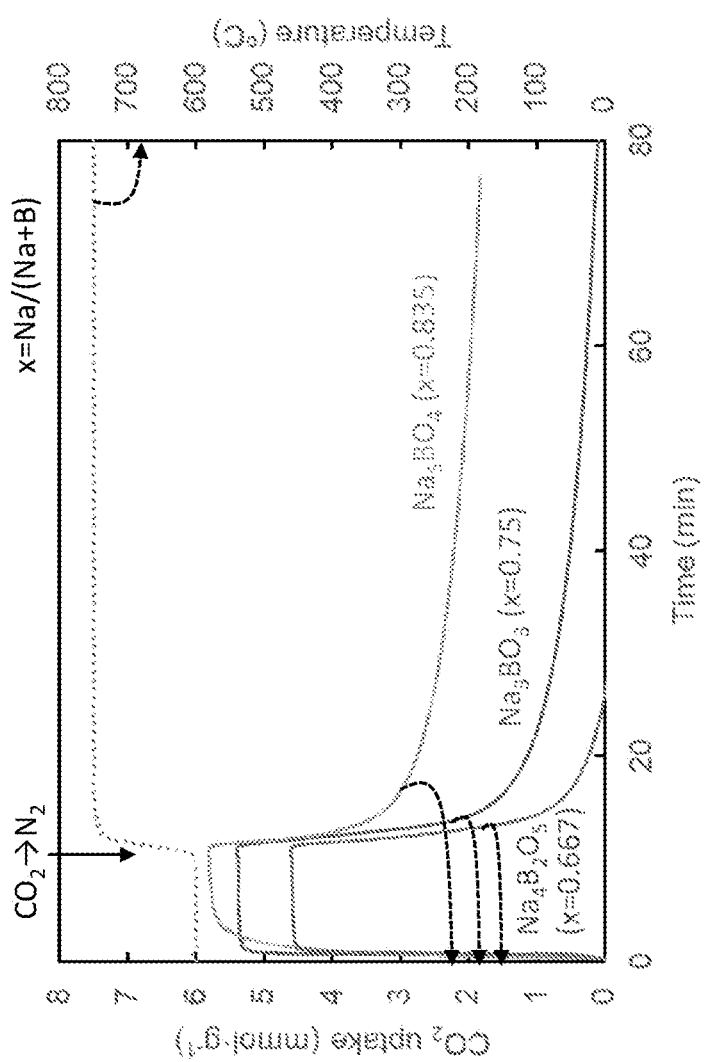
FIG. 6B is a plot of the sequestration and desorption of $CO_2$ by various sequestration materials of the form $Na_xB_{1-x}O_y$ with various mixing ratios (x) as a function of temperature, according to certain embodiments.

The effect of the mixing ratio of moles of alkali metal (to moles of alkali metal and moles of boron) (x) in the alkali metal borates on the $CO_2$ uptake and desorption performance was also examined. FIG. 6A shows $CO_2$ uptake by sodium borate with different mixing ratio (x) as the temperature increases under a flow of 100% $CO_2$. The results revealed that the uptake by sodium borate with high mixing ratio of sodium (x=0.835) was initiated at low temperature around 200° C., and the uptake rate was accelerated gradually as the temperature increased. The uptake leveled off as the temperature exceeded 600° C. For the case of sodium borate with a low mixing ratio of sodium (x=0.667), the uptake behavior with increasing temperature was similar to that of sodium borate with x=0.75. FIG. 6B shows the isothermal uptake of $CO_2$ under a flow of 100% $CO_2$ at 600° C. and desorption at 750° C. under a flow of $N_2$ by the sodium borate with different x. The results indicate that the uptake capacity became higher as the mixing ratio of sodium (x) increased, whereas the desorption curve of the sample with high sodium ratio was leveled off with a high amount of residual $CO_2$ and was not completed in a short duration. In particular, for the case of x=0.835, 30% of $CO_2$ taken by the reaction with $CO_2$ remained after at least 1 h of desorption at 750° C.

Figure 7A:
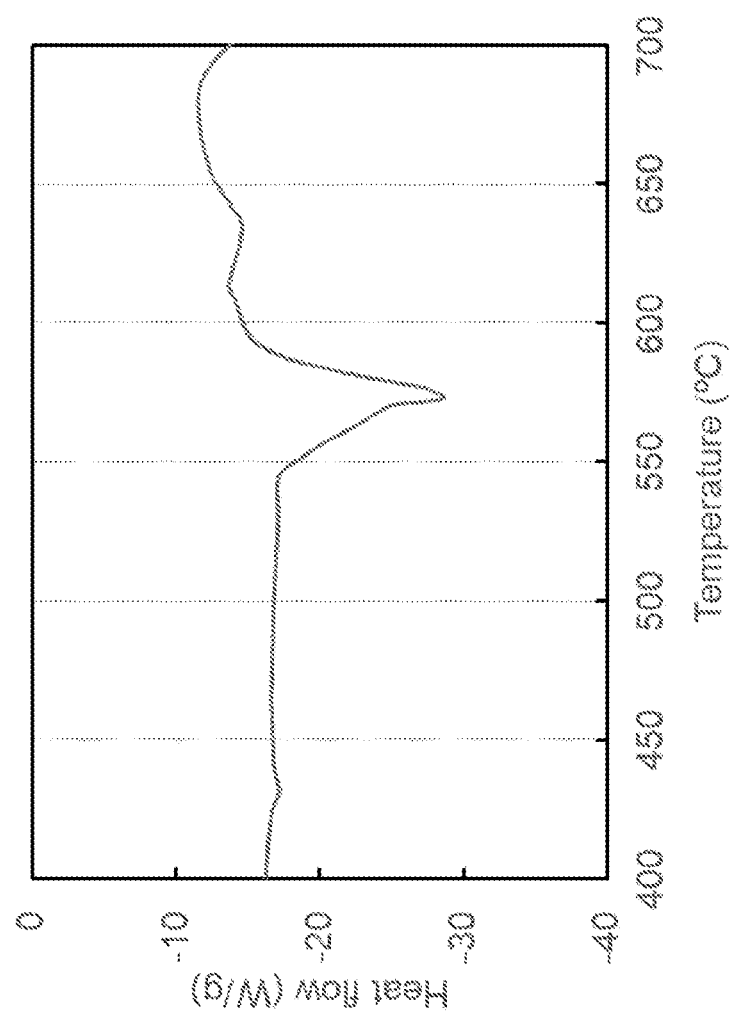
FIG. 7A is a plot of the heat flow of a sequestration material being heated, according to certain embodiments.

The above results demonstrated that at least some alkali metal borates showed high $CO_2$ uptake performance at medium-high temperatures. In particular, for the case of the sodium borate with low (x<0.75), or of the mixed alkali metals, the rapid uptake of $CO_2$ was initiated when the temperature exceeded a threshold temperature ($T_{on}$). These samples also showed cyclic regenerability with no significant decrease in uptake capacity or reaction rate in higher cycle numbers. To gain an understanding of the temperature dependence of $CO_2$ uptake performance by these sequestration materials, the physical state of the sequestration materials with increasing temperature was examined through the variation of heat flow applied to the sample to increase the temperature of the sample at a constant rate. FIG. 7A shows the variation of heat flow applied on $Na_xB_{1-x}O_y$ (x=0.75) to increase the temperature at the rate of 5° C./min under the flow of 100% $N_2$. The result exhibited a clear endothermic peak at around 570° C., indicating that the oxide was melted into molten oxide. The good agreement of the melting curve with the threshold temperature where the steep jump was initiated suggests that the $CO_2$ uptake depends strongly on the physical state. Without wishing to be bound by theory, ultra-fast $CO_2$ uptake and cyclic regenerability may have been realized at least in part due to the liquid phase of the oxides (molten oxides) at the temperature higher than the melting point.

Without wishing to be bound by theory, the peculiar $CO_2$ uptake performance by the molten oxides may be explained by the gas-liquid chemical reaction to precipitate the solid products. When the solid particles of alkali metal borates are heated over their melting point, the oxides may be transformed into molten oxides, which include the monovalent alkali metal cation (A⁺), trivalent boron cation (B³⁺), and divalent oxygen anion (0²⁻) as follows, $$A_xB_{1-x}O_y(s) \rightarrow xA^+(m) + (1-x)B^{3+}(m) + (y)O^{2-}(m) \quad (1)$$

where, (s) and (m) represent the solid and molten ionic oxide states, respectively. When $CO_2$ is introduced as a gas stream, the $CO_2$ may physically dissolve in the molten oxides first and then quickly react with the oxygen anions to form carbonate anions ($CO_3^{2-}$) as, $$CO_2(g) \leftrightarrow CO_2(m) \quad (2)$$

$$CO_2(m) + O^{2-}(m) \leftrightarrow CO_3^{2-}(m) \quad (3)$$

Figure 7B:
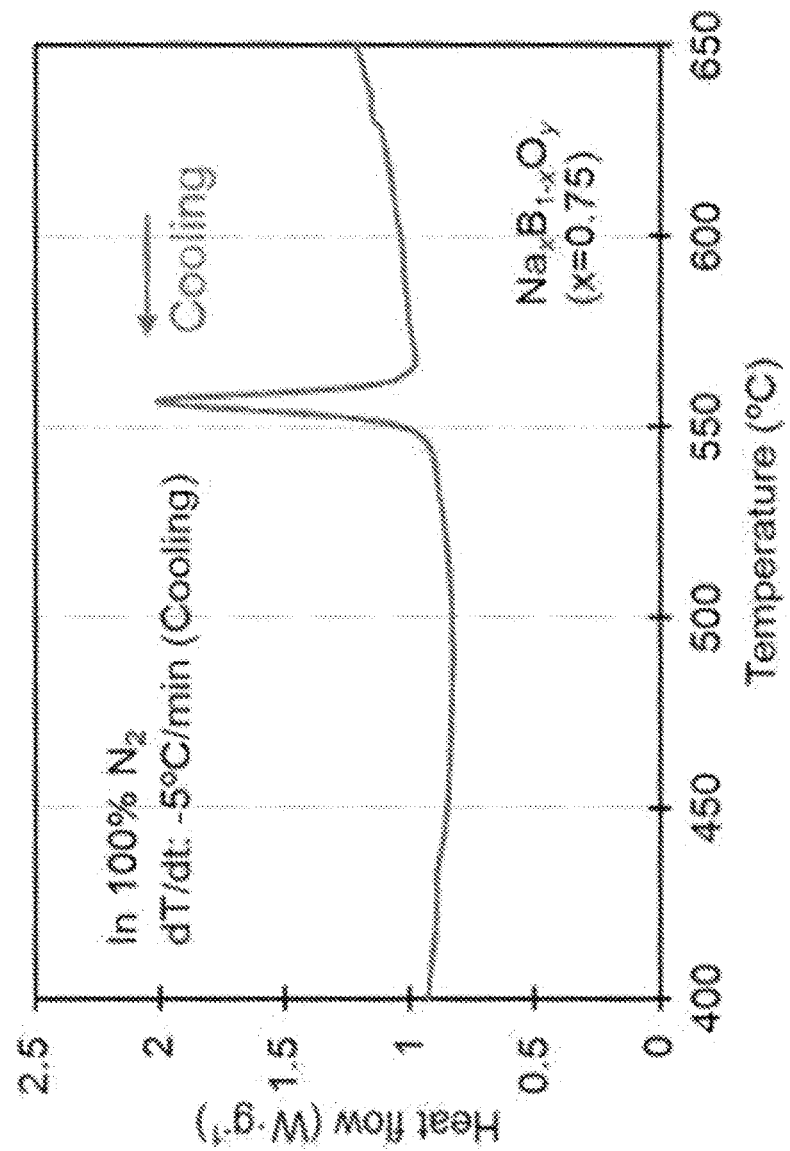
FIG. 7B is a plot of the heat flow of a sequestration material being cooled under a flow of 100% $N_2$, according to certain embodiments.
Figure 7C:
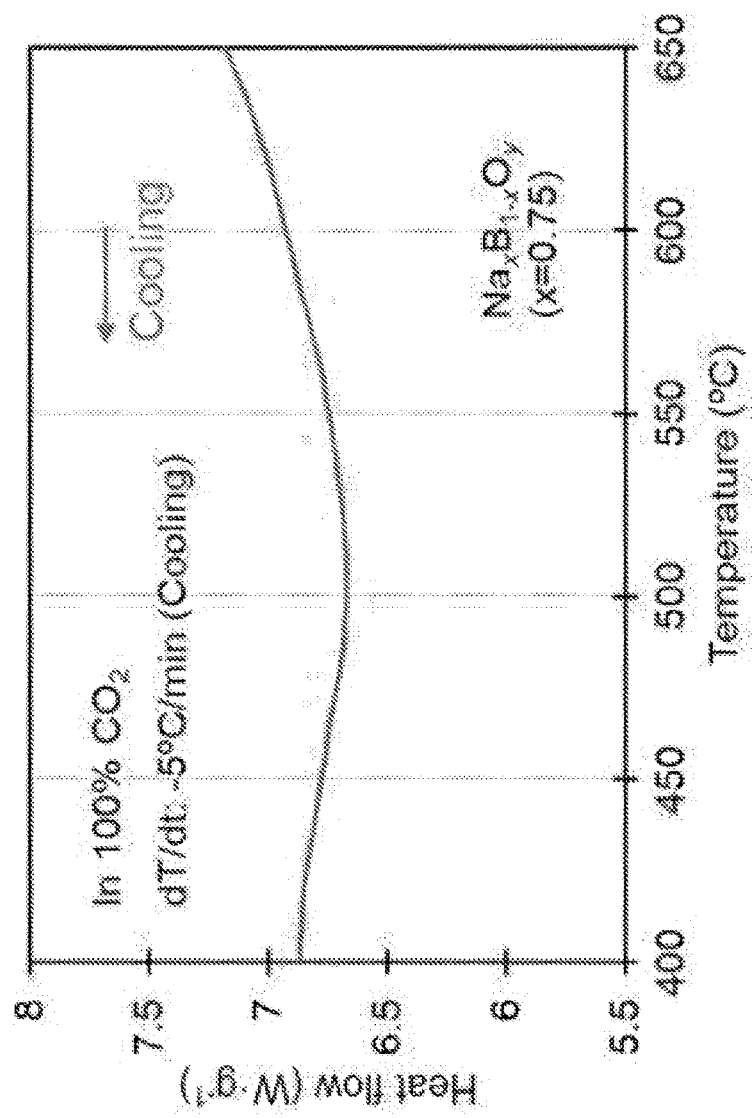
FIG. 7C is a plot of the heat flow of a sequestration material being cooled under a flow of 100% $CO_2$, according to certain embodiments.
Figure 8:
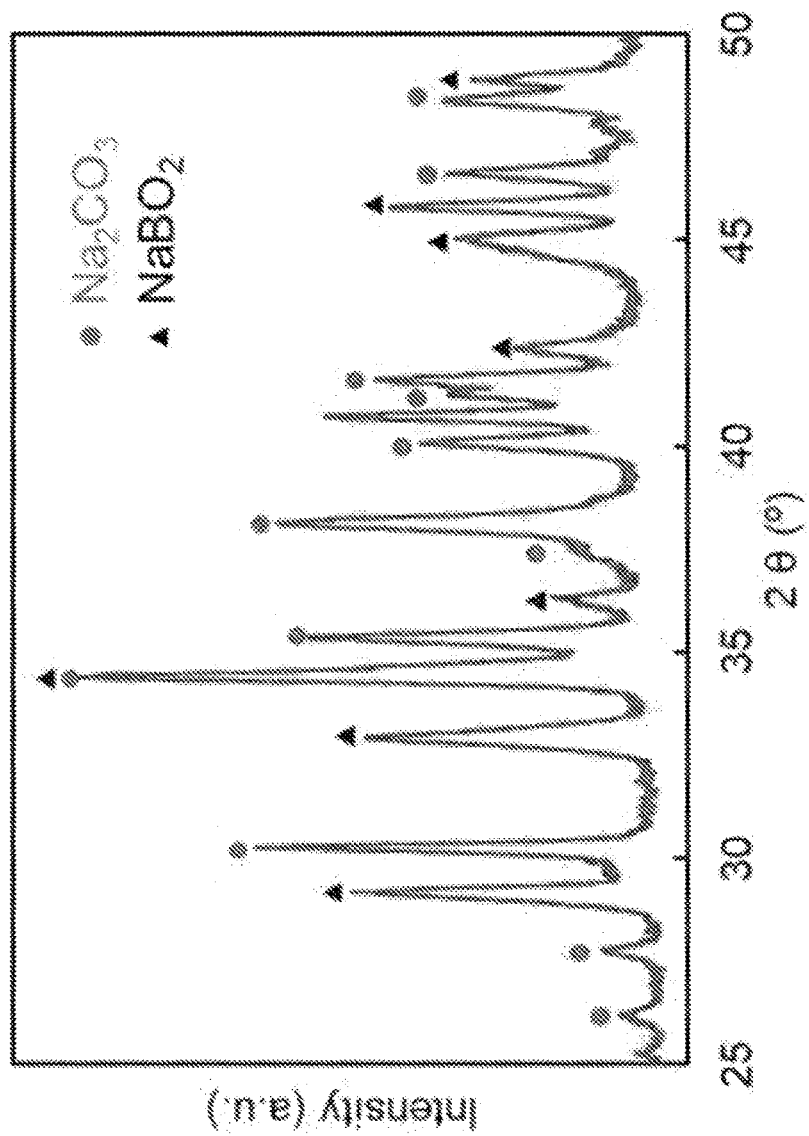
FIG. 8 is an X-ray diffraction (XRD) spectrum of a sequestration material after a reaction with $CO_2$, according to certain embodiments.

The carbonate anions ($CO_3^{2-}$) may react further with the alkali metal cations ($A_+$) in the molten oxides to form the alkali metal carbonate ($A_2CO_3$). For the identification of the compounds generated in the molten alkali metal borate by the reaction with $CO_2$, the crystallographic phase composition of the product by the reaction of $Na_xB_{1-x}O_y$ (x=0.75) with $CO_2$ at 600° C. for 30 min was examined by XRD, as shown in FIG. 8. The result indicates that two different compounds, $Na_2CO_3$ and $NaBO_2$, were generated by the reaction with $CO_2$. As the melting point of $NaBO_2$ phase (~968° C.) is higher than that of $Na_xB_{1-x}O$ (x=0.75), without wishing to be bound by theory, a solid phase of $NaBO_2$ may have precipitated out from the molten sodium borate as the concentration of alkali metal ions in the molten oxide decreases by the formation of $Na_2CO_3$ solid crystals. FIG. 7B and FIG. 7C show the variation of heat flow applied on $Na_xB_{1-x}O_z$ (x=0.75) as cooled from 700° C. under a flow of $N_2$ without the reaction with $CO_2$ and that from cooling under a flow of $CO_2$ after the reaction with $CO_2$ at 700° C. for 30 min, respectively.

For the case of cooling in the flow of $N_2$ without the reaction with $CO_2$, a clear exothermic peak in the variation of heat flow, which is ascribed to the solidification of the sodium borate, appeared at around 560° C. In contrast, no exothermic peak appeared in the heat flow after the reaction with $CO_2$. The results indicate that the liquid phase of molten oxide did not remain after the reaction with $CO_2$ at 700° C. for 30 min due to precipitation of the two solid products.

The cycle regenerability realized by the sequestration material may also be explained by the behavior of the molten oxides. Cycle deterioration due to morphological deformation cannot occur due to the fluidic nature of the liquid. Without wishing to be bound by theory, the rapid mass transfer of ionic species in the molten oxides may have averaged out the defects or the inhomogeneity of molecular distribution rapidly to maintain the original uptake performance regardless of the increasing number of operation cycles.

Figure 9:
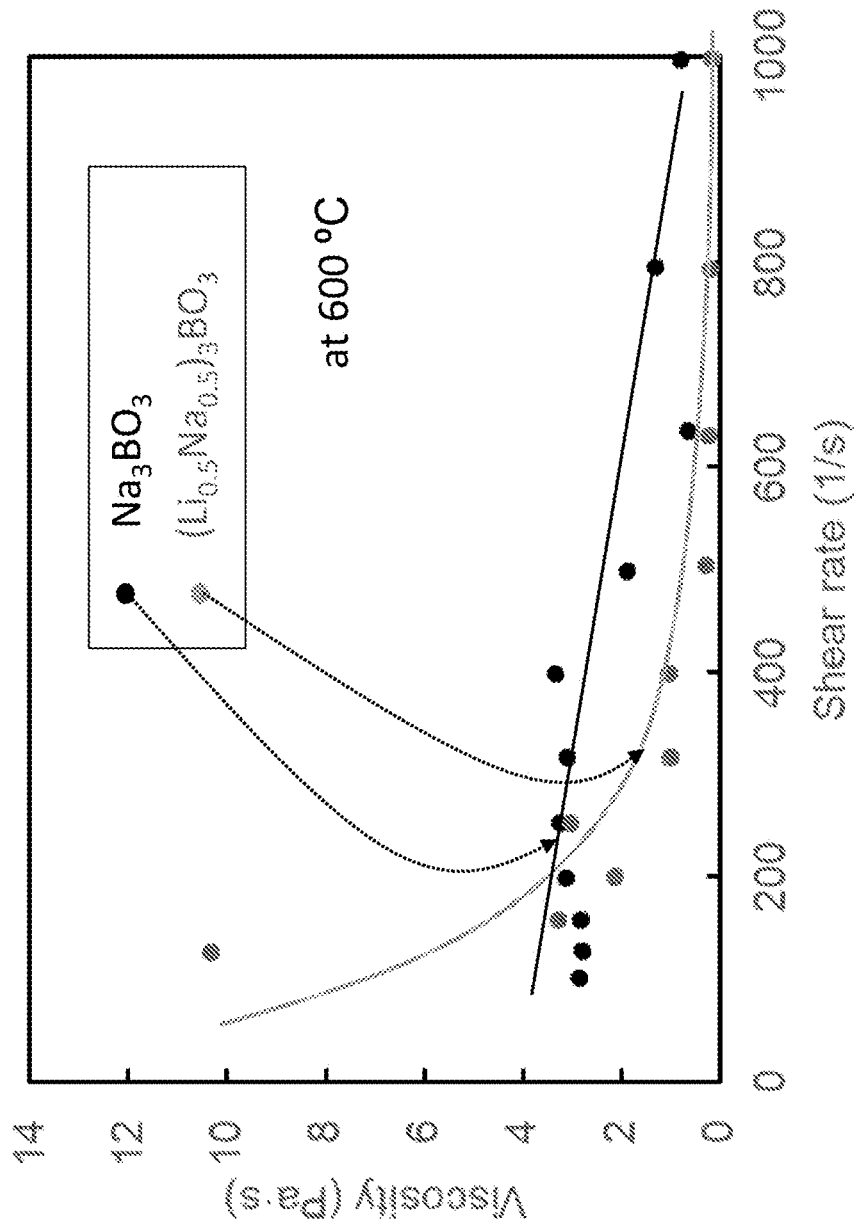
FIG. 9 is a plot of the viscosity of various sequestration materials as a function of shear rate, according to certain embodiments.

For the realization of a practical $CO_2$ capture system, the fluidic molten alkali metal borates also have an advantage from an engineering point of view. For $CO_2$ capture using the solid adsorbents, various types of fluidized bed reactors have been proposed. The fluidized bed reactors are constructed in general by the combination of two sets of reactor batches, cyclones and transfer lines for the solid adsorbents, and have several limitations for the system scale up toward the establishment of low-cost commercialized plants. The fluidic molten sequestration materials open the possibility for a simplified continuous carbon capture system with improved flow capability. FIG. 9 shows the viscosity of $Na_xB_{1-x}O_y$ (x=0.75) and $(Li—Na)_xB_{1-x}O_y$ (x=0.75) in the molten state at 600° C. The result showed shear-thinning behavior, and the viscosities for $Na_xB_{1-x}O_y$ (x=0.75) and $(Li—Na)_xB_{1-x}O_y$ (x=0.75) at the shear rate of 1000 (1/s) were 0.790 Pa*s and 0.170 Pa*s, respectively. These relatively low viscosity fluids can be transferred through transfer lines from the stripper to absorber by a simple feed pump. The modification of the circulation system may contribute to the reduction of the capital and operation cost for the $CO_2$ capture system.

Example 4

Figure 11A:
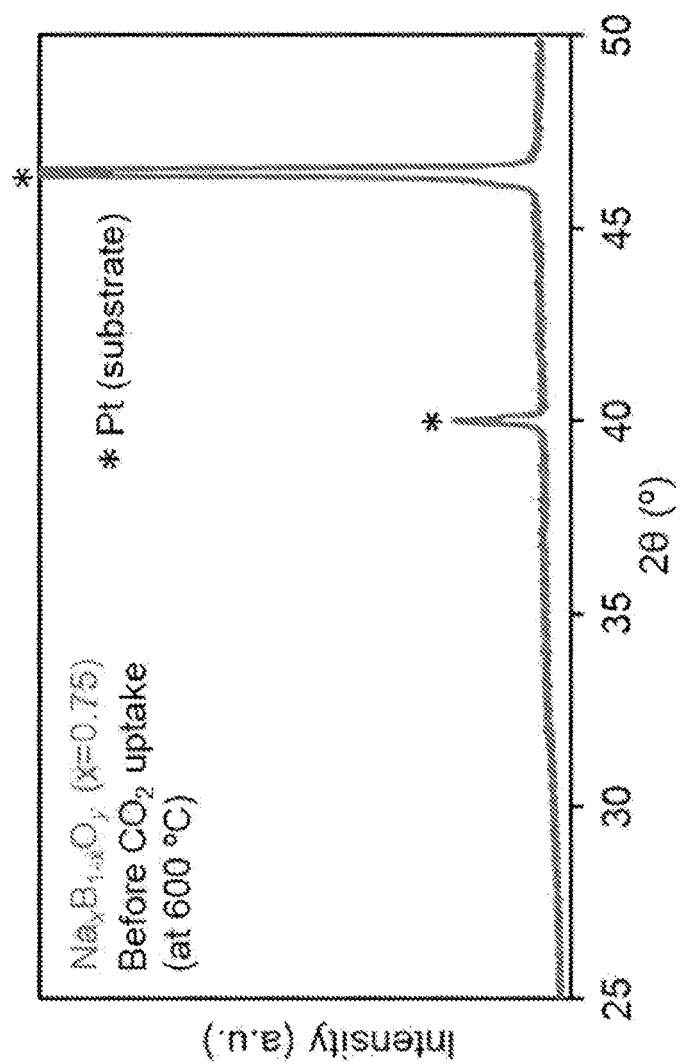
FIG. 11A is an XRD spectrum of a sequestration material $Na_xB_{1-x}O_y$ (x=0.75) before exposure to and/or reaction with $CO_2$, according to certain embodiments.
Figure 11B:
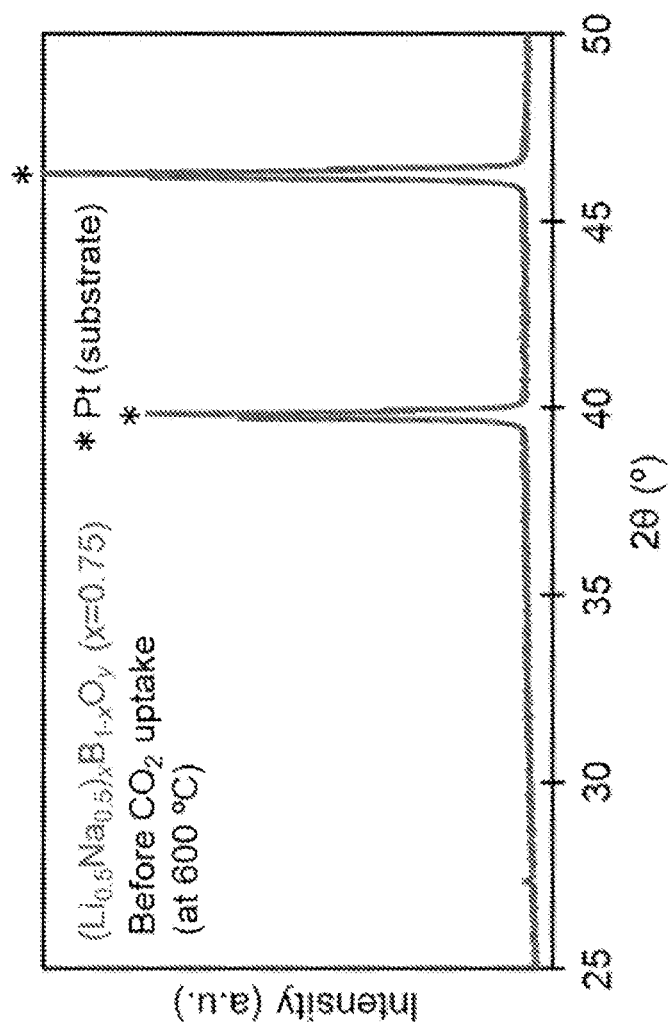
FIG. 11B is an XRD spectrum of a sequestration material $(Li_{0.5}Na_{0.5})_xB_{1-x}O_y$ (x=0.75) before exposure to and/or reaction with $CO_2$, according to certain embodiments.
Figure 11C:
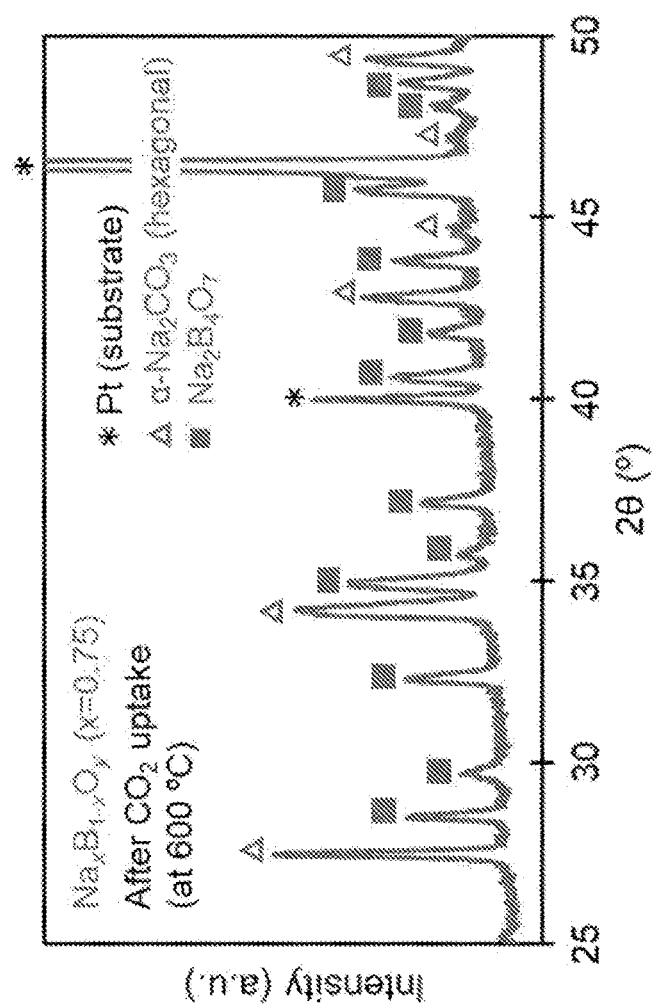
FIG. 11C is an XRD spectrum of a sequestration material $Na_xB_{1-x}O_y$ (x=0.75) after exposure to and/or reaction with $CO_2$ for 30 min, according to certain embodiments.
Figure 11D:
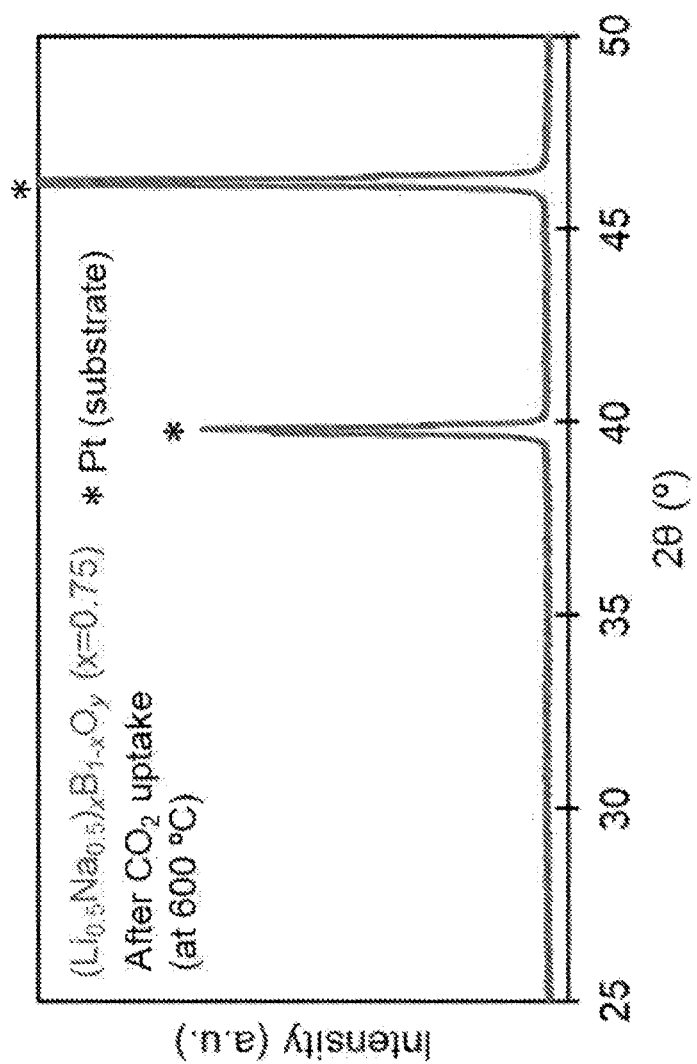
FIG. 11D is an XRD spectrum of a sequestration material $(Li_{0.5}Na_{0.5})_xB_{1-x}O_y$ (x=0.75) after exposure to and/or reaction with $CO_2$ for 30 min, according to certain embodiments.

The following example describes $CO_2$ uptake by sequestration materials. Physical state and phase composition of two different types of sodium-including alkali-metal borates, $Na_xB_{1-x}O_y$ (x=0.75) and $(Li_{0.5}Na_{0.5})_xB_{1-x}O_y$ (x=0.75), at a reaction temperature for $CO_2$ uptake were examined further by temperature-controllable in-situ XRD. FIG. 11A and FIG. 11B show XRD spectra for $Na_xB_{1-x}O_y$ (x=0.75) and $(Li_{0.5}Na_{0.5})_xB_{1-x}O_y$ (x=0.75) at 600° C. before exposure to and/or reaction with $CO_2$. No distinctive diffraction peaks of solid crystals appeared in both of the XRD spectra at 600° C., except for the peaks ascribed to a Pt-sheet used as a substrate for XRD analysis. The results help to demonstrate that these alkali-metal borates were in a molten (liquid) state at 600° C. before reaction with $CO_2$. After exposure to and/or reaction with $CO_2$ for 30 min, clear multiple peaks appeared in the XRD spectrum at the same temperature for $Na_xB_{1-x}O_y$ (x=0.75), as shown in FIG. 11C, indicating that solid precipitants were generated by reaction of $Na_xB_{1-x}O_y$ (x=0.75) with $CO_2$. Peak identification of the spectum revealed that solid crystals of α-$Na_2CO_3$ and $Na_2B_4O_7$ were precipitated out at 600° C. In contrast, no clear peaks emerged for $(Li_{0.5}Na_{0.5})_xB_{1-x}O_y$ (x=0.75) even after exposure to and/or reaction with $CO_2$ for 30 min, as shown in FIG. 11D. The results indicate that the uptake of $CO_2$ by $(Li_{0.5}Na_{0.5})_xB_{1-x}O_y$ (x=0.75) proceeded without the generation of solid precipitants. Without wishing to be bound by theory, since the melting point of the mixed lithium-sodium carbonate is as low as ~500° C. at around the equimolar eutectic composition, the mixed carbonates generated by the reaction with $CO_2$ may have existed as ionized molten liquids. Here, the carbonate ions ($CO_3^{2-}$) produced by the reaction of $CO_2$ and oxygen anion ($O^{2-}$) may be stabilized in the molten oxides by the coordination of double alkali-metal ions (Lit and Nat) to the carbonate ions at the reaction temperature (600° C.).

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
    exposing a sequestration material, comprising a salt in molten form, to an environment containing carbon dioxide such that at least some of the carbon dioxide interacts with the sequestration material and is sequestered from the environment,
    wherein the salt in molten form comprises:
       at least one alkali metal cation;
       boron; and
       oxygen.

2. The method of claim 1, wherein the boron is in the form of at least one boron cation.

3. The method of claim 2, wherein the at least one boron cation comprises $B^{3+}$.

4. The method of claim 1, wherein the oxygen is in the form of at least one oxygen anion.

5. The method of claim 4, wherein the at least one oxygen anion comprises $O^{2-}$.

6. A method, comprising:
    exposing a sequestration material, comprising a salt in molten form, to an environment containing carbon dioxide such that at least some of the carbon dioxide interacts with the sequestration material and is sequestered from the environment,
    wherein the salt in molten form comprises:
       at least one alkali metal cation; and
       at least one boron oxide anion and/or a dissociated form thereof.

7. The method of claim 1, wherein the environment contains carbon dioxide in an amount of at least 1 mol %.

8. The method of claim 1, wherein at least 1.0 mmol of carbon dioxide is sequestered from the environment per gram of the sequestration material.

9. The method of claim 1, wherein at least 1.0 mmol of carbon dioxide is sequestered from the environment per gram of the sequestration material within a period of 1 hour.

10. The method of claim 1, wherein the temperature of the sequestration material is at least 200° C. during at least a portion of the sequestration of the carbon dioxide.

11. The method of claim 1, further comprising regenerating the sequestration material by removing, from the sequestration material, at least 95 mol % of the carbon dioxide sequestered by the sequestration material.

12. The method of claim 1, further comprising cycling the sequestration material at least 10 times, wherein the amount of carbon dioxide sequestered by the sequestration material during the 10th cycle is at least 1 mmol per gram of the sequestration material.

13. The method of claim 1, wherein the environment is part of and/or derived from the output of a combustion process.

14. The method of claim 1, wherein the environment is contained within a reactor.

15. The method of claim 1, wherein the at least one alkali metal cation comprises cationic lithium (Li), sodium (Na), potassium (K), rubidium (Rb), and/or cesium (Cs).

16. The method of claim 1, wherein the at least one alkali metal cation comprises cationic lithium (Li), sodium (Na), and/or potassium (K).

17. The method of claim 1, wherein less than 1 wt % of the sequestration material is made up of a salt comprising a nitrate and/or a nitrite.

18. A method comprising:
   melting a solid sequestration material comprising a salt; and
   using the molten sequestration material to sequester carbon dioxide
   wherein a fractional stoichiometry of the salt in solid form can be expressed as $M_xB_{1-x}O_y$, wherein x is between zero and 1, and wherein M comprises at least one alkali metal cation.

19. The method of claim 18, wherein y=1.5−x.

20. The method of claim 19, wherein M comprise Li and Na.

21. The method of claim 19, wherein x is between or equal to 0.5 and 0.9.

* * * * *

UNITED STATES PATENT AND TRADEMARK OFFICE
CERTIFICATE OF CORRECTION

PATENT NO. : 11,311,840 B2
APPLICATION NO. : 17/282522
DATED : April 26, 2022
INVENTOR(S) : Trevor Alan Hatton et al.

It is certified that error appears in the above-identified patent and that said Letters Patent is hereby corrected as shown below:

In the Claims

At Column 29, Claim 18, Line 5, the word "dioxide" should read --dioxide,--

Signed and Sealed this
Twentieth Day of September, 2022

Katherine Kelly Vidal
Director of the United States Patent and Trademark Office